(12) United States Patent
Zhang et al.

(10) Patent No.: US 8,727,043 B2
(45) Date of Patent: May 20, 2014

(54) CUTTER ASSEMBLIES, DOWNHOLE TOOLS INCORPORATING SUCH CUTTER ASSEMBLIES AND METHODS OF MAKING SUCH DOWNHOLE TOOLS

(75) Inventors: Youhe Zhang, Spring, TX (US); Yuelin Shen, Spring, TX (US); Yuri Burhan, Spring, TX (US); Gregory T. Lockwood, Pearland, TX (US)

(73) Assignee: Smith International, Inc., Houston, TX (US)

( * ) Notice: Subject to any disclaimer, the term of this patent is extended or adjusted under 35 U.S.C. 154(b) by 487 days.

(21) Appl. No.: 12/814,189

(22) Filed: Jun. 11, 2010

(65) Prior Publication Data

US 2010/0314176 A1 Dec. 16, 2010

Related U.S. Application Data

(60) Provisional application No. 61/186,722, filed on Jun. 12, 2009.

(51) Int. Cl.
*E21B 10/567* (2006.01)
*E21B 10/42* (2006.01)
*E21B 10/633* (2006.01)
*E21B 10/573* (2006.01)

(52) U.S. Cl.
CPC ............. *E21B 10/573* (2013.01); *E21B 10/633* (2013.01)
USPC .......................... 175/428; 175/432; 175/413

(58) Field of Classification Search
CPC ..... E21B 10/567; E21B 10/573; E21B 10/62; E21B 10/627; E21B 10/633
USPC .................... 175/432, 413, 412, 428
See application file for complete search history.

(56) References Cited

U.S. PATENT DOCUMENTS

| | | | |
|---|---|---|---|
| 1,723,381 A | | 8/1929 | Seifert |
| 3,563,325 A | * | 2/1971 | Miller .................. 175/420.1 |
| 3,609,818 A | | 10/1971 | Wentorf |
| 3,693,736 A | * | 9/1972 | Gardner .................. 175/426 |
| 3,745,623 A | | 7/1973 | Wentorf et al. |
| 3,850,591 A | | 11/1974 | Wentorf |
| 4,026,605 A | * | 5/1977 | Emmerich ............. 299/107 |
| 4,199,035 A | * | 4/1980 | Thompson ............. 175/432 |
| 4,222,446 A | | 9/1980 | Vasek |
| 4,394,170 A | | 7/1983 | Sawaoka et al. |
| 4,403,015 A | | 9/1983 | Nakai et al. |
| 4,466,498 A | * | 8/1984 | Bardwell ............... 175/426 |
| 4,511,006 A | | 4/1985 | Grainger |

(Continued)

FOREIGN PATENT DOCUMENTS

| | | |
|---|---|---|
| GB | 1239074 | 7/1971 |
| GB | 2115460 | 9/1983 |
| WO | 2008095005 A1 | 8/2008 |
| WO | 2009012432 A2 | 1/2009 |

OTHER PUBLICATIONS

International Search Report and Written Opinion dated Jan. 25, 2011 for corresponding PCT application No. PCT/US2010/038365 filed Jun. 11, 2010.

*Primary Examiner* — Kenneth L Thompson

(57) ABSTRACT

Cutter assemblies comprising an outer support element and a cutting element disposed therein. The cutting element is immovably attached to the outer support element. Also provided are downhole tools incorporating such cutter assemblies and methods of making such downhole tools.

27 Claims, 14 Drawing Sheets

(56) References Cited

U.S. PATENT DOCUMENTS

| | | | |
|---|---|---|---|
| 4,525,178 A | 6/1985 | Hall | |
| 4,553,615 A | 11/1985 | Grainger | |
| 4,647,546 A | 3/1987 | Hall et al. | |
| 4,654,947 A * | 4/1987 | Davis | 29/402.08 |
| 4,669,556 A * | 6/1987 | Barr et al. | 175/432 |
| 4,751,972 A | 6/1988 | Jones et al. | |
| 4,954,139 A | 9/1990 | Cerutti | |
| 5,127,923 A | 7/1992 | Bunting et al. | |
| 5,383,527 A | 1/1995 | Azar | |
| 5,497,843 A * | 3/1996 | Burns et al. | 175/403 |
| 5,678,645 A * | 10/1997 | Tibbitts et al. | 175/426 |
| 5,737,980 A | 4/1998 | Keith | |
| 5,810,103 A | 9/1998 | Torbet | |
| 5,819,862 A | 10/1998 | Matthias et al. | |
| 5,906,245 A | 5/1999 | Tibbitts et al. | |
| 6,427,791 B1 | 8/2002 | Glowka et al. | |
| 6,592,985 B2 | 7/2003 | Griffin et al. | |
| 6,772,849 B2 | 8/2004 | Oldham et al. | |
| 6,945,338 B1 * | 9/2005 | Defourny et al. | 175/106 |
| 7,373,997 B2 | 5/2008 | Kembaiyan et al. | |
| 7,517,589 B2 | 4/2009 | Eyre | |
| 7,533,739 B2 | 5/2009 | Cooley et al. | |
| 7,533,740 B2 | 5/2009 | Zhang et al. | |
| 7,604,073 B2 | 10/2009 | Cooley et al. | |
| 7,669,674 B2 | 3/2010 | Hall et al. | |
| 7,762,359 B1 * | 7/2010 | Miess | 175/432 |
| 8,011,456 B2 | 9/2011 | Sherwood | |
| 2002/0175555 A1 | 11/2002 | Mercier | |
| 2005/0087371 A1 | 4/2005 | Kembaiyan | |
| 2005/0247492 A1 | 11/2005 | Shen et al. | |
| 2005/0269139 A1 | 12/2005 | Shen et al. | |
| 2006/0124358 A1 | 6/2006 | Mensa-Wimot | |
| 2007/0079991 A1 | 4/2007 | Cooley et al. | |
| 2007/0131459 A1 | 6/2007 | Voronin et al. | |
| 2007/0278017 A1 | 12/2007 | Shen et al. | |
| 2008/0006448 A1 | 1/2008 | Zhang et al. | |
| 2008/0017419 A1 | 1/2008 | Cooley et al. | |
| 2008/0223623 A1 | 9/2008 | Keshavan et al. | |
| 2008/0230280 A1 | 9/2008 | Keshavan et al. | |
| 2008/0251293 A1 | 10/2008 | Mumma et al. | |
| 2009/0020339 A1 | 1/2009 | Sherwood, Jr. | |
| 2009/0038442 A1 | 2/2009 | Shamburger et al. | |
| 2009/0120008 A1 | 5/2009 | Lockwood et al. | |
| 2009/0173014 A1 | 7/2009 | Voronin et al. | |
| 2009/0173548 A1 | 7/2009 | Voronin et al. | |
| 2009/0324348 A1 | 12/2009 | Cooley et al. | |
| 2010/0258355 A1 | 10/2010 | De Maindreville | |
| 2011/0031031 A1 | 2/2011 | Vempati | |
| 2013/0112480 A1 * | 5/2013 | Newman | 175/57 |

* cited by examiner

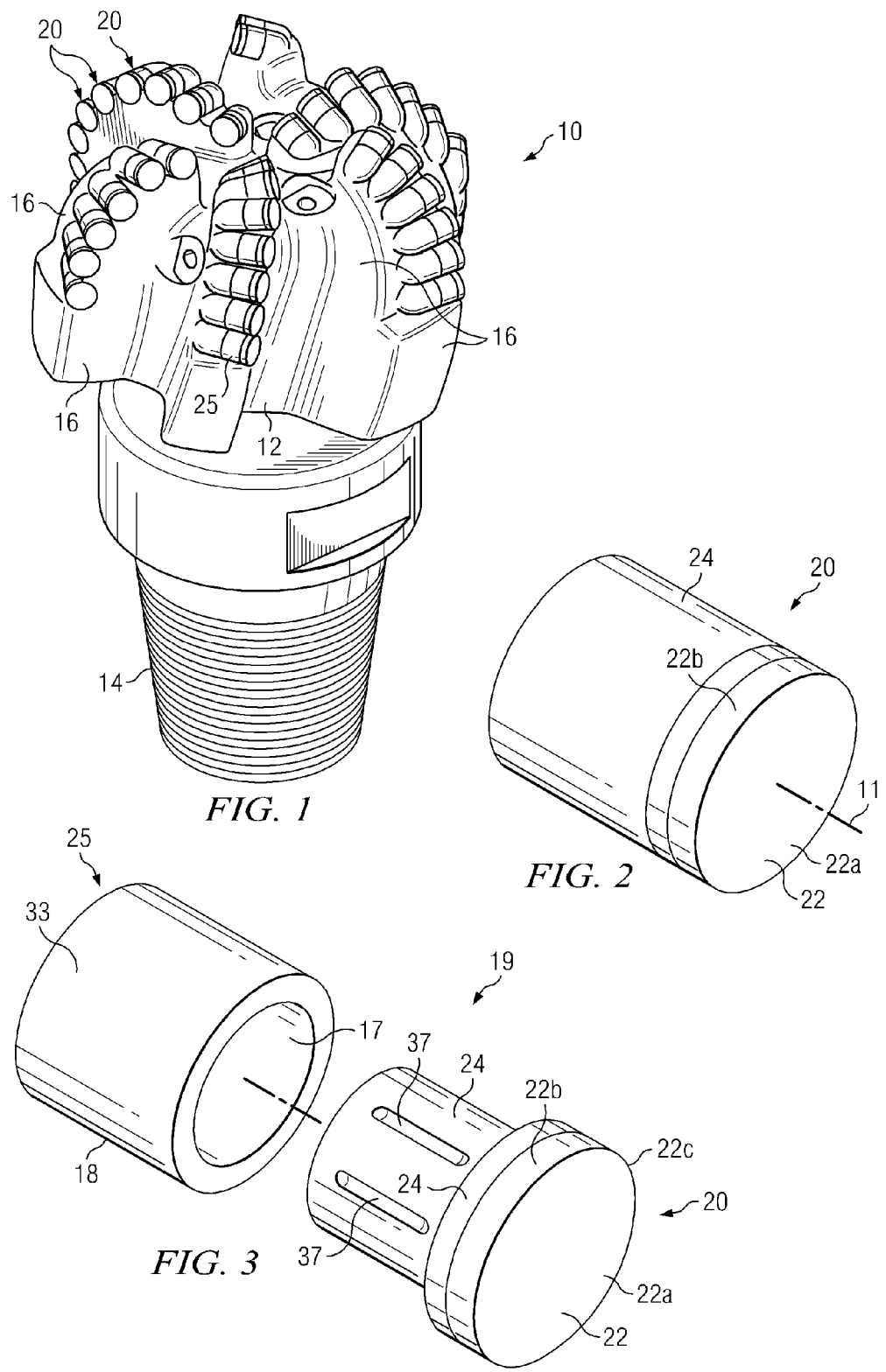

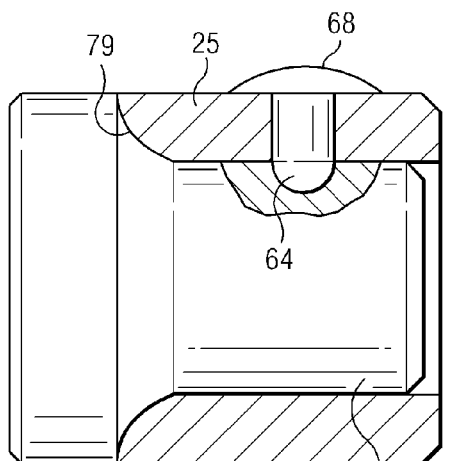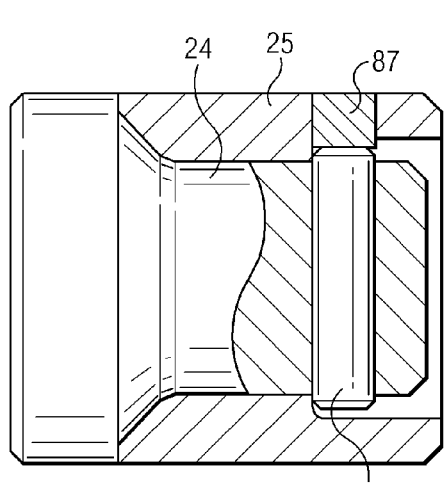
FIG. 20     FIG. 21
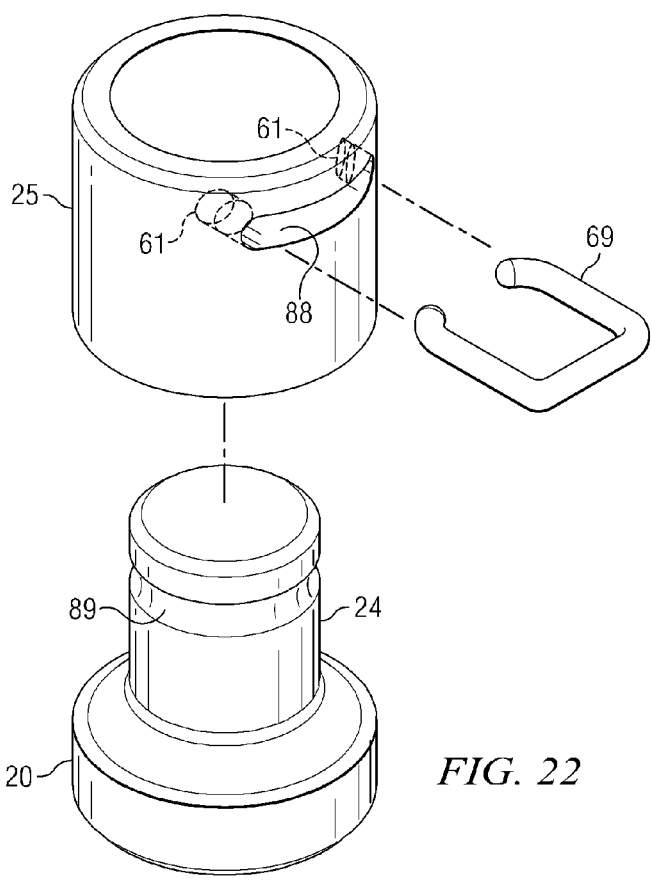
FIG. 22

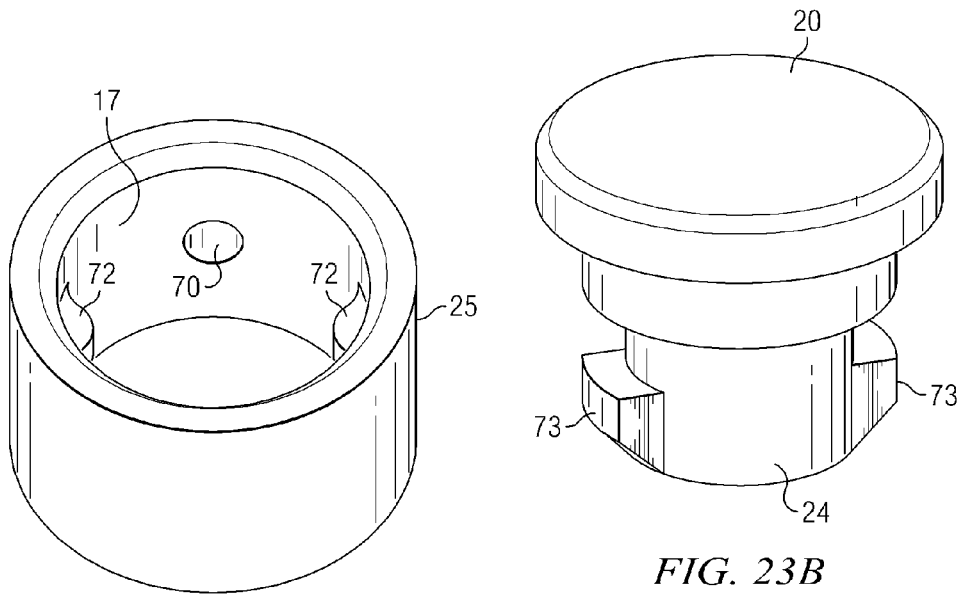
FIG. 23A
FIG. 23B
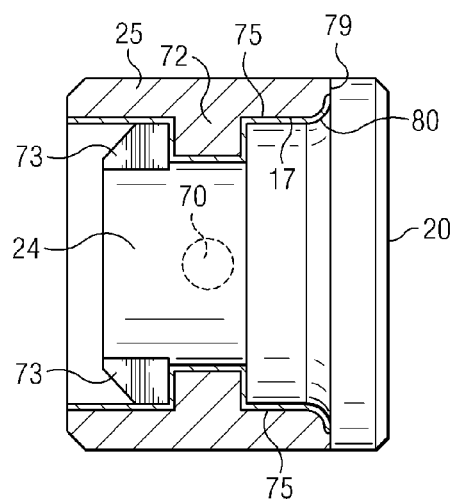
FIG. 23C
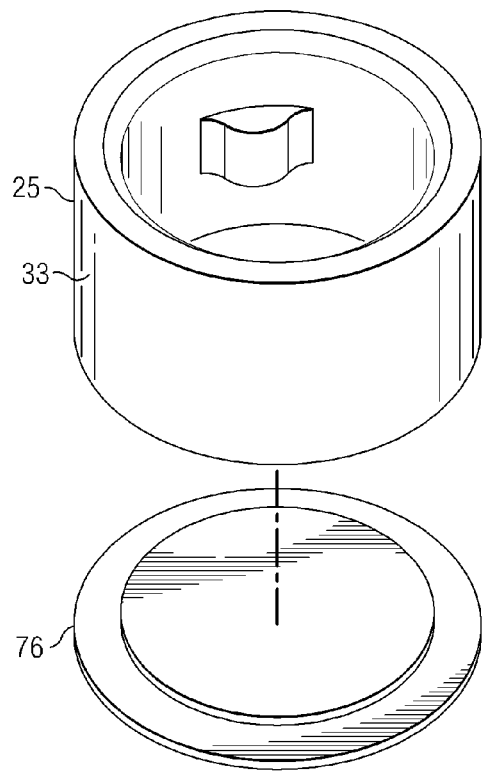
FIG. 23D

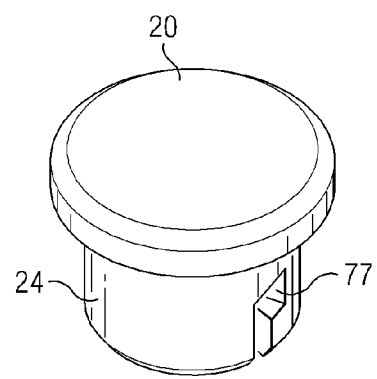
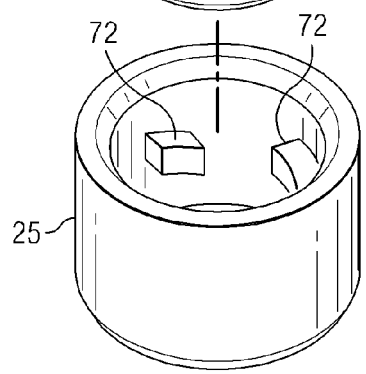
FIG. 24A
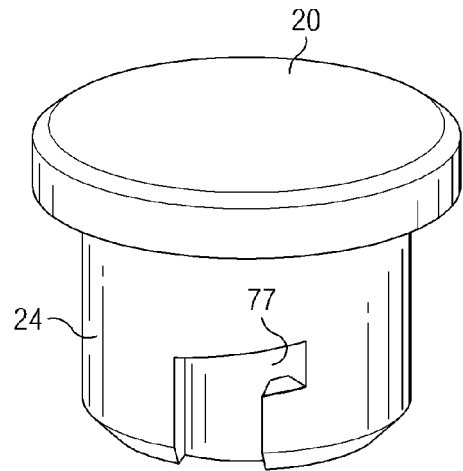
FIG. 24B
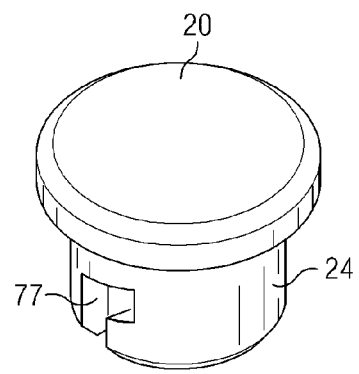
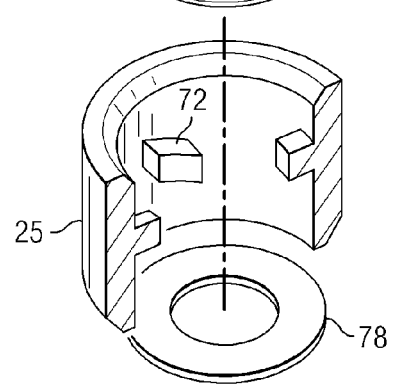
FIG. 24C

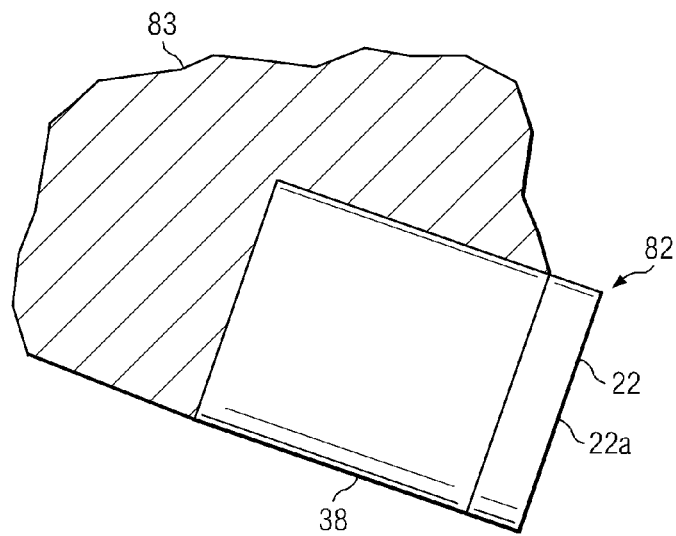
*FIG. 25*
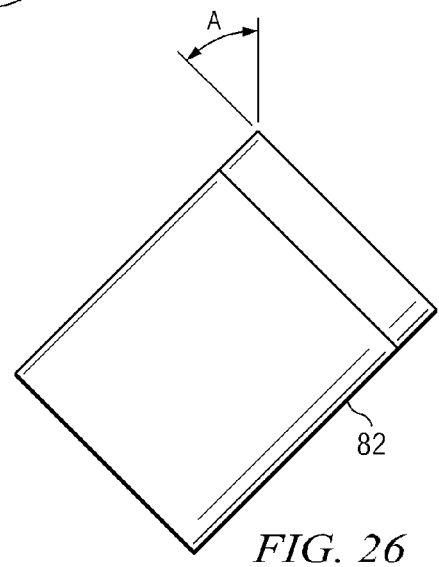
*FIG. 26*
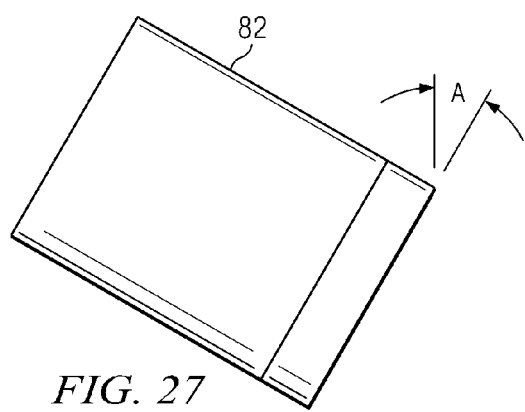
*FIG. 27*

CUTTER ASSEMBLIES, DOWNHOLE TOOLS INCORPORATING SUCH CUTTER ASSEMBLIES AND METHODS OF MAKING SUCH DOWNHOLE TOOLS

CROSS-REFERENCE TO RELATED APPLICATIONS

This application claims priority to U.S. Provisional Application No. 61/186,722, filed Jun. 12, 2009, which is hereby incorporated by reference in its entirety.

BACKGROUND OF INVENTION

1. Field of the Invention

Embodiments disclosed herein relate generally to cutting elements containing a layer of ultrahard material. More particularly, embodiments of the present disclosure relate to cutter assemblies which include such cutting elements for use in a drill bit or other downhole cutting tool.

2. Background Art

Polycrystalline diamond compact ("PDC") cutters have been used in industrial applications including rock drilling and metal machining for many years. In a typical application, a compact of polycrystalline diamond (PCD) (or other ultrahard material) is bonded to a substrate material, which is typically a sintered metal-carbide to form a cutting structure. PCD comprises a polycrystalline mass of diamonds (typically synthetic) that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

A PDC cutter may be formed by placing a sintered carbide substrate into the container of a press. A mixture of diamond grains or diamond grains and catalyst binder is placed atop the substrate and treated under high pressure, high temperature conditions. In doing so, metal binder (often cobalt) migrates from the substrate and passes through the diamond grains to promote intergrowth between the diamond grains. As a result, the diamond grains become bonded to each other to form the diamond layer, and the diamond layer is in turn integrally bonded to the substrate. The substrate often comprises a metal-carbide composite material, such as tungsten carbide-cobalt. The deposited diamond layer is often referred to as the "diamond table" or "abrasive layer."

Typically, the substrate used to form the cutting element is chosen based upon properties which are beneficial to forming the abrasive layer of ultrahard material on the surface of the substrate using a high pressure/high temperature (HPHT) process, for example, the type and quantity of metal binder (e.g., cobalt) in the substrate and the grain size of the metal carbide used to form the substrate. However, substrates which have properties beneficial to the formation of the abrasive layer may not have optimum properties with respect to operating conditions, for example sufficient erosion resistance, corrosion resistance, hardness, toughness, braze strength, etc. As a result, cutting elements may be retrieved from a previously used tool (e.g., drill bit) which has been used to cut an earthen formation and which could otherwise be re-used in another tool (e.g., either a new or rebuilt drill bit) except for the damage to the cutting element. Such cutting elements are typically discarded at significant cost (as an otherwise useable abrasive layer can no longer be utilized in another drill bit).

Another significant factor in determining the longevity of PDC cutters is the exposure of the cutter to heat. Exposure to heat can cause thermal damage to the diamond table and eventually result in the formation of cracks (due to differences in thermal expansion coefficients) which can lead to spelling of the polycrystalline diamond layer, delamination between the polycrystalline diamond and substrate, and conversion of the diamond back into graphite causing rapid abrasive wear. The thermal operating range of conventional PDC cutters is typically 700-750 ° C. or less.

As mentioned, conventional polycrystalline diamond is stable at temperatures of up to 700-750° C. in air, above which observed increases in temperature may result in permanent damage to and structural failure of polycrystalline diamond. This deterioration in polycrystalline diamond is due to the significant difference in the coefficient of thermal expansion of the binder material, cobalt, as compared to diamond. Upon heating of polycrystalline diamond, the cobalt and the diamond lattice will expand at different rates, which may cause cracks to form in the diamond lattice structure and result in deterioration of the polycrystalline diamond. Damage may also be due to graphite formation at diamond-diamond necks leading to loss of microstructural integrity and strength loss, at extremely high temperatures.

Cutters are conventionally attached to a drill bit or other downhole tool by a brazing process. In the brazing process, a braze material is positioned between the cutter and the cutter pocket. The material is melted and, upon subsequent solidification, bonds (attaches) the cutter in the cutter pocket. Selection of braze materials depends on their respective melting temperatures, as higher braze temperatures cannot be used without resulting in damage to the diamond layer prior to the bit (and cutter) even being used in a drilling operation.

This temperature restriction greatly limits the number of alloys that can be used as braze alloy for cutting elements with diamond layers thereon because most brazing alloys that provide sufficient shear strength for bonding cutting elements to a drill bit also require brazing at temperatures above 700° C. Therefore, alloys suitable for brazing cutting elements with diamond layers thereon have been limited to only a couple of alloys which offer low enough brazing temperatures to avoid damage to the diamond layer and high enough braze strength to retain cutting elements on drill bits. Further, in most manual brazing processes, it is difficult to control the brazing temperature.

Accordingly, there exists a continuing need to develop ways to extend the life of a cutting element and for developments in cutting element attachment methods to prevent thermal damage to PDC cutters during installation in a downhole tool and improve the ease of rebuilding such downhole tools.

SUMMARY OF THE INVENTION

In one aspect, embodiments disclosed herein relate to cutter assemblies comprising an outer support element and a cutting element disposed therein. The cutting element is immovably attached to the outer support element.

In another aspect, embodiments disclosed herein relate to downhole tools incorporating such cutter assemblies and methods of making such downhole tools.

Other aspects and advantages of the invention will be apparent from the following description and the appended claims.

BRIEF DESCRIPTION OF THE DRAWINGS

FIG. 1 shows a perspective view of a fixed cutter drill bit according to one or more embodiments of the present disclosure.

FIG. 2 shows a perspective view of a conventional PDC cutting element.

FIG. 3 shows a perspective view of a cutter assembly according to one or more embodiments of the present disclosure.

FIG. 20 shows a cross-sectional view of a cutter assembly according to one or more embodiments of the present disclosure.

FIG. 21 shows a cross-sectional view of a cutter assembly according to one or more embodiments of the present disclosure.

FIG. 22 shows a perspective view of a cutter assembly according to one or more embodiments of the present disclosure.

FIGS. 23A-B show perspective views of a cutter assembly according to one or more embodiments of the present disclosure.

FIG. 23C shows a cross-sectional view of the cutter assembly of FIGS. 23A-B.

FIG. 23D shows a perspective view of an outer support element according to one or more embodiments of the present disclosure.

FIGS. 24A-B show perspective views of a cutter assembly according to one or more embodiments of the present disclosure.

FIG. 24C shows a perspective view of a cutter assembly according to one or more embodiments of the present disclosure.

FIGS. 25, 26, 27 illustrate back rake angles for a cutting element.

DETAILED DESCRIPTION

Figure 4:
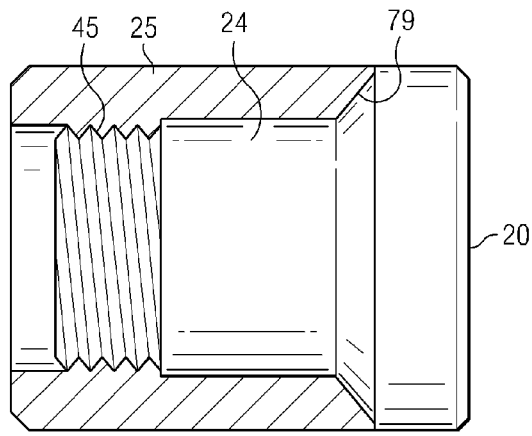
FIG. 4 shows a cross-sectional view of a cutter assembly according to one or more embodiments of the present disclosure.

Embodiments disclosed herein relate to downhole cutting tools and methods for manufacturing downhole cutting tools. In particular, some embodiments disclosed herein relate to a cutter assembly which includes an outer support element and a cutting element for use in a downhole cutting tool. Use of an outer support element protects the substrate and optionally the ultrahard material layer of the cutting element from the operating conditions normally experienced and allows for re-use in another tool (either a new or rebuilt tool/drill bit) of a cutting element that otherwise would have been too damaged for re-use. The outer support element may be replaced or the damaged portion of the substrate and optionally the damaged portion of the ultrahard material layer near the substrate interface may be removed and the cutting element re-used in a cutter assembly on a new or rebuilt tool (e.g., drill bit) resulting in a significant cost savings. Use of the outer support element can also allow for a material with different properties from the substrate of the cutting element to be positioned around at least a portion of the exterior surface of the cutting element. For example, the outer support element may comprise a material having one or more different properties from the substrate of the cutting element, in particular the outer support element may have a greater abrasion resistance, erosion resistance, corrosion resistance, hardness, braze strength, and/or toughness than the substrate of the cutting element. Materials with such properties may not be conventionally used as substrate materials for cutting elements as they may tend to form inferior attachment of ultrahard material layers to a substrate during a HPHT process, especially when the ultrahard material is polycrystalline diamond. Additionally, the outer support element may allow for the use of a material which may provide improved properties but would not typically be used for a substrate having to undergo high pressure/high temperature conditions sufficient for forming the ultrahard material layer.

One or more embodiments disclosed herein relate to brazing methods used in a downhole cutting tool. In particular, some embodiments disclosed herein relate to brazing a cutter assembly to a downhole tool. The cutter assembly includes an outer support element which circumferentially surrounds at least a portion of the axial length of a cutting element positioned therein. The cutting element may have a fully exposed cutting face. The cutter assembly can allow for the use of a high strength braze material to secure the outer support element to the cutter pocket (cavity). Such high strength braze materials conventionally would not have been utilized to attach a cutting element to a cutter pocket due to potential damage to the ultrahard material from the high braze temperatures. In one or more embodiments, a second material different from the first braze material may be used in a subsequent step to attach the cutting element containing an ultrahard material layer within the outer support element. In some example embodiments, the second material may be a braze material different from the first braze material which has a lower melting temperature than the first material. This allows for improved retention of the cutter assemblies, in particular the cutting elements, without having to utilize braze temperatures proximal the ultrahard material which could damage the cutting element.

Additionally, the outer support element and the cutting element may be precisely formed such that the space between the outer surface of the cutting element (e.g., substrate) and the inner surface of the outer support element is controlled within narrow tolerances resulting in a substantially uniform spacing or distance between the surfaces. The inner surface of the outer support element and the outer surface of the cutting element may be formed through the molding techniques used to form the outer support element and cutting element and/or mechanically removing material to form the surfaces. Mechanical removal techniques may include machining, electro-discharge machining (EDM), grinding, electro-discharge grinding, laser cutting, etching, and combinations thereof. The substantially uniform spacing can result in improved attachment of the cutting element to the outer support element as compared to conventional attachment of the cutting element to the cutter pocket or cavity where a non-uniform space is typically present. This improved attachment can allow for the use of a larger variety of second materials to attach the cutting element to the outer support element.

The following disclosure is directed to various embodiments of the invention. The embodiments disclosed have broad application, and the discussion of any embodiment is meant only to be exemplary of that embodiment, and not intended to suggest that the scope of the disclosure, including the claims, is limited to that embodiment or to the features of that embodiment.

Certain terms are used throughout the following description and claims to refer to particular features or components. As one skilled in the art will appreciate, different persons may refer to the same feature or component by different names. This document does not intend to distinguish between components or features that differ in name only. The drawing figures are not necessarily to scale. Certain features and components herein may be shown exaggerated in scale or in somewhat schematic form and some details of conventional elements may not be shown in the interest of clarity and conciseness.

In the following description and in the claims, the terms "including" and "comprising" are used in an open-ended fashion, and thus, should be interpreted to mean "including, but not limited to . . . ."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, quantities, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of 1 to 4.5 should be interpreted to include not only the explicitly recited limits of 1 to 4.5, but also include individual numerals such as 2, 3, 4, and sub-ranges such as 1 to 3, 2 to 4, etc. The same principle applies to ranges reciting only one numerical value, such as "at most 4.5", which should be interpreted to include all of the above-recited values and ranges. Further, such an interpretation should apply regardless of the breadth of the range or the characteristic being described.

As used herein, unless specified differently, the term "different compositions" or "different materials" is meant to also include compositions/materials which contain the same components but the components may differ in amount, particle size, particle shape, etc. such that the different features operate to provide a different mechanical and/or thermal property in the material.

As used herein, the mesh sizes refer to standard U.S. ASTM mesh sizes. The mesh size indicates a wire mesh screen with that number of holes per linear inch, for example a "16 mesh" indicates a wire mesh screen with sixteen holes per linear inch, where the holes are defined by the crisscrossing strands of wire in the mesh. The hole size is determined by the number of meshes per inch and the wire size. When using ranges to describe sizes of particles, the lower mesh size denotes (which may also have a "−" sign in front of the mesh size) the size of particles that are capable of passing through an ASTM standard testing sieve of the smaller mesh size and the greater mesh size denotes (which also may have a "+" sign in front of the mesh size) the size of particles that are incapable of passing through an ASTM standard testing sieve of the larger mesh size. For example, particles having sizes in the range of from 16 to 35 mesh (−16/+35 mesh) means that particles are included in this range which are capable of passing through an ASTM No. 16 U.S.A. standard testing sieve, but incapable of passing through an ASTM No. 35 U.S.A. standard testing sieve.

Referring to FIG. 1, a drill bit 10, specifically a fixed cutter drill bit, is shown. The drill bit 10 includes a bit body 12, which may be formed of a matrix material, such as a tungsten carbide powder infiltrated with an alloy binder material, or may be a machined steel body. The bit body 12 includes a threaded connection 14 at one end for coupling the bit 10 to a drilling string assembly (not shown). The bit body 12 also includes a cutting element support structure which, in this example, comprises a plurality of blades 16 extending radially from the center of the bit. Each of the blades 16 includes a plurality of cutter pockets (or cavities) (26 in FIGS. 3 and 8) formed therein along the periphery to accept and support an outer support element 25 having at least a portion of a cutting element 20 positioned therein.

The cutting elements 20 may include polycrystalline diamond or diamond like compact cutting elements, which may also be referred to as "PDC cutters" or "cutters" 20. A perspective view of a cutting element 20 is shown, for example, in FIG. 2. In general, polycrystalline diamond or diamond like compacts have been used in industrial applications including rock drilling and metal machining for many years. Referring to FIG. 2, typically, in these applications, a compact of ultrahard material 22, such as polycrystalline diamond ("PCD") or polycrystalline cubic boron nitride ("PCBN"), is integrally bonded during a HPHT process to a substrate material 24 to form a cutting element 20. The ultrahard material layer 22 has a cutting face 22a and a side surface 22b. Cutting element 20 has a central longitudinal axis 11. The cutting element may be a newly manufactured cutting element or may be a cutting element which has been previously used in a drilling operation. As discussed above, the use of an outer support element can prolong the life of the cutting element which can result in improved drilling performance and significant cost savings.

Suitably, the substrate may comprise a metal carbide and a metal binder which has been sintered (also referred to herein as a sintered metal carbide). Suitably, the metal of the metal carbide may be selected from chromium, molybdenum, niobium, tantalum, titanium, tungsten and vanadium and alloys and mixtures thereof. For example, sintered tungsten carbide may be formed by sintering a mixture of stoichiometric tungsten carbide and a metal binder. The amount of metal binder may be in the range of from 2 to 25% weight (% w), based on the total weight of the substrate, in particular from 2 to 15% w, on the same basis. A greater amount of metal binder in the substrate may improve fracture toughness of the substrate while a lesser amount of metal binder may improve wear resistance of the substrate, in particular hardness, abrasion resistance, corrosion resistance, and erosion resistance.

The particle sizes of the metal carbide used to form the sintered metal carbide may also be varied. The particles of metal carbide may be in the form of non-spherical (crushed) particles or spherical particles (i.e., pellets). The term "spherical", as used herein and throughout the present disclosure, means any particle having a generally spherical shape and may not be true spheres, but lack the corners, sharp edges, and angular projections commonly found in crushed and other non-spherical particles. The term, "non-spherical", as used herein in the present disclosure, means any particle having corners, sharp edges and angular projections commonly found in non-spherical particles. Larger particle sizes of greater than 6 microns, in particular in the range of from 8 to 16 microns may be used. Use of larger particle sizes of the metal carbide may also provide improved fracture toughness. Smaller particle sizes of 6 microns or less, in particular in the range of from 1 micron to 6 microns may also be used. Use of smaller particle sizes of the metal carbide may also provide improved wear resistance of the substrate, in particular improved erosion resistance, and hardness. The particle sizes of the metal carbide may also be multi-modal which may provide substrates and cutter elements with various properties. The metal binder may be selected from iron, cobalt, nickel, alloys, and mixtures thereof. Suitably, the substrate may be a tungsten carbide sintered with a cobalt binder.

The ultrahard material 22 bonded to the substrate 24 is sometimes referred to as a diamond table or abrasive layer. The substrate 24 and ultrahard material 22 together form the PDC cutting element 20. Methods for making diamond and composite compacts are described, for example in U.S. Pat. Nos. 3,745,623; 3,609,818; 3,850,591; 4,394,170; 4,403,015; 4,525,178; and 4,647,546; and 4,954,139, which methods are incorporated by reference herein in their entirety.

In one or more embodiments, the cutting element may be a standard cutting element comprising an abrasive layer of ultrahard material (e.g., diamond table) and a sintered metal carbide substrate. Suitably, a standard polycrystalline diamond cutting element may have a diamond table which has a material microstructure comprising a matrix phase of bonded together diamond crystals formed at HPHT conditions in the presence of catalyst material. The diamond table has a surface (i.e., cutting face and side surface) and interstitial regions disposed between the diamond crystals. The interstitial regions have the catalyst material disposed therein throughout the diamond body. The ultrahard material layer and the substrate may be integrally attached during a HPHT process.

In one or more embodiments, the cutting element may be a cutting element, as described above, which additionally has a first region comprising the catalyst material disposed within the interstitial regions and remote from the working surface and a second region comprising interstitial regions that are substantially free of the catalyst material. In one or more embodiments, the interstitial regions may be substantially free of the catalyst material in the second region to a depth within the diamond body (layer) of less than about 0.25 mm from the desired surface or surfaces, preferably up to about 0.1 mm. In some embodiments, the interstitial regions may be substantially free of the catalyst material in the second region to a depth of less than about 1 mm from the desired surface or surfaces, preferably in the range of from 0.25 mm to about 1 mm, for example from about 0.3 mm to about 0.8 mm, such as 0.275 mm, 0.35 mm, 0.4 mm, 0.45 mm, 0.5 mm, 0.6 mm, or 0.7 mm. Ultimately, the specific depth of the region formed in the diamond body that is substantially free of the catalyst material will vary depending on the particular properties desired for the cutting element. Methods for making such cutting elements are described in U.S. Pat. Nos. 7,517,589 and 6,592,985, which methods are herein incorporated by reference.

In one or more embodiments, the cutting element may comprise a diamond layer which may have been modified such that the interstitial regions throughout the diamond layer are substantially free of the catalyst material used to form the diamond layer under high pressure/high temperature conditions. In one region of the diamond layer, the interstitial regions may be filled with an infiltrant material that was not used to initially form the diamond layer. In another region of the diamond layer, the interstitial regions may be substantially free of the infiltrant material. Suitable depths for such regions that are substantially free of infiltrant material may be the same as those discussed hereinbefore. Such polycrystalline diamond cutting elements are described in U.S. 2008/0223623 A1, which is incorporated by reference herein in its entirety. Such cutting elements can have improved thermal characteristics, such as thermal stability, as well as other properties (wear resistance, impact resistance, etc.) when compared to cutting elements having at least a portion of the interstitial regions of the diamond layer containing catalyst material.

In one or more embodiments, the diamond layer of the cutting element may or may not comprise a replacement material instead of an infiltrant material or in combination with an infiltrant material or catalyst material depending on the properties desired for the cutting element. The replacement material may include any non-catalyzing material or non-infiltrant material, for example non-refractory metals, ceramics, silicon and silicon-containing compounds, ultra-hard materials such as diamond and cubic boron nitride, Group IB elements of the Periodic table such as copper, and mixtures thereof. Such replacement materials are described in U.S. 2008/0230280 A1 to Keshavan et al. and U.S. Pat. No. 5,127,923 to Bunting et al., which descriptions are incorporated herein by reference. In some example embodiments, the interstitial regions throughout the diamond body may be substantially free of the catalyst material and at least a portion of the interstitial regions may be filled with a replacement material.

In one or more embodiments, the diamond layer of the cutting element may be substantially free of catalyst material within the interstitial regions throughout the diamond body and may have a first region positioned remote from the working surface of the diamond layer which comprises a replacement material disposed within the interstitial regions. The diamond layer may have a second region which comprises interstitial regions that are substantially free of the replacement material and any infiltrant material. Suitable depths for such regions that are substantially free of replacement material and any infiltrant material may be the same as those discussed hereinbefore. The choice of material or materials used as a replacement material can and will vary depending on the desired properties of the cutting element such as the desired mechanical properties and/or thermal characteristics.

As used herein, the term "infiltrant material" is understood to refer to materials that are other than the catalyst material that was used to initially form the diamond layer, and can include materials identified in Group VIII of the Periodic table (e.g., cobalt) that have subsequently been introduced into the sintered diamond body after the catalyst material used to form the same has been removed therefrom. Additionally, the term "infiltrant material" is not intended to be limiting on the particular method or technique used to introduce such material into the interstitial regions of the already formed diamond table.

As used herein, the term "catalyst material" is understood to refer to materials that were used to initially form the diamond layer (i.e., bond the diamond particles together), and can include materials identified in Group VIII of the Periodic table (CAS version of the periodic table in the CRC Handbook of Chemistry and Physics) (e.g., cobalt).

As used herein, the term "removed" is used to refer to the reduced presence of a specific material in the interstitial regions of the diamond layer, for example the reduced presence of the catalyst material used to initially form the diamond body during the sintering or HPHT process, or the reduced presence of an infiltrant material, or the reduced presence of a replacement material. It is understood to mean that a substantial portion of the specific material (e.g., catalyst material) no longer resides within the interstitial regions of the diamond layer. However, it is to be understood that some small amounts of the material may still remain in the microstructure of the diamond layer within the interstitial regions and/or remain adhered to the surface of the diamond crystals. Additionally, the term "substantially free", as used herein, is understood to mean that there may still be some small amounts of the specific material remaining within the interstitial regions of the diamond layer. The quantity of the specific material remaining in interstitial regions after the diamond body has been subjected to treatment to remove the same can and will vary on such factors as the efficiency of the removal process, and the size and density of the diamond matrix material. The specific material to be removed from the diamond layer may be removed by any suitable process, for example by chemical treatment such as by acid leaching or aqua regia bath.

In one or more embodiments, the cutting element may also have intermediate layers as well as planar and non-planar interfaces and surfaces. Reference may be made to U.S. Pat. No. 7,533,740, as an example of non-planar interfaces and such description is incorporated herein by reference. In one or more embodiments, the cutting element may also comprise a diamond table having properties of diamond density, catalyst material concentration, infiltrant material concentration, replacement material concentration and/or diamond grain size that changes as a function of position within the diamond table. Such variations may provide one or more different properties to the cutting element.

As shown in FIG. 3 in accordance with one or more embodiments of the present disclosure, a cutter assembly 19 comprises an outer support element 25 and a cutting element 20. Cutting element 20 has a substrate 24 and an ultrahard material layer 22. The ultrahard material layer has a cutting face 22a, a cutting edge 22c, and a side surface 22b. The outer support element 25 has a side portion 33 having an outer surface 18 and an inner surface 17 forming a cavity into which the substrate 24 of cutting element 20 is partially disposed in and immovably attached. The cutting element 20 is, thus, partially surrounded by the outer support element 25. Substrate 24 of cutting element 20 has several grooves 37. In one or more embodiments, the substrate may have a plurality of grooves along the surface of the substrate to aid in the penetration of the second material into the cavity of the outer support element. Structural features such as the outer support element cavity; the outer surface of the cutting element, including any grooves formed in the surface of the substrate; any protrusions with mating cavities in the outer support element and cutting element; etc. may be formed, for example, through the molding techniques used to form the outer support element and cutting element and/or material removal techniques. Removal techniques may include machining, electro-discharge machining (EDM), grinding, electro-discharge grinding, laser cutting, etching and combinations thereof.

The cutting element may be immovably attached to the outer support element by a variety of mechanisms. In one or more embodiments, the cutting element may be immovably attached to the outer support element by a mechanical locking mechanism, for example a press fit, a shrink fit, a threaded retention arrangement, a set pin type arrangement, a spring-loaded retention arrangement, an interlocking protrusion arrangement, a protrusion/cavity arrangement, etc. and combinations thereof. In one or more embodiments, the mechanical locking mechanism may be exposed, in part, to an outer surface of the tool body providing access for removal of the cutting element from the outer support element.

In one or more embodiments, the cutting element may be immovably attached to the outer support element by a threaded retention arrangement (mechanism). One example of a threaded retention arrangement, as shown in FIG. 4, includes a threaded attachment arrangement in which a cutting element 20 may be threadably attached 45 to the outer support element 25 by providing the substrate 24 of the cutting element with threads which can be threaded into mating apertures formed in the inner surface of the outer support element. Alternatively, the cutting element may be threadably attached to the outer support element by providing the inner surface of the outer support element with threads which can be threaded into mating apertures formed in the substrate of the cutting element. The direction of rotation of the threaded attachment between the substrate and the outer support element can be set to complement the direction of rotation of the downhole tool (e.g., drill bit) so that the cutting elements are not loosened by the cutting action of the downhole tool. Additionally, it is possible to supplement the threaded attachment between the cutting elements and the outer support elements with known techniques such as thread-locking adhesives or washers.

Figure 5:
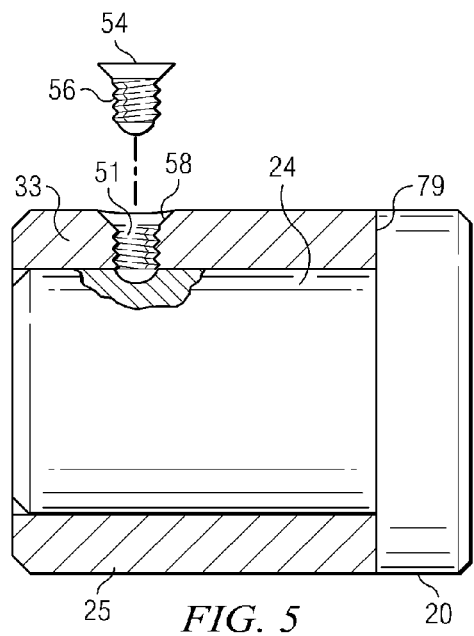
FIG. 5 shows a cross-sectional view of a cutter assembly according to one or more embodiments of the present disclosure.

As shown in FIG. 5, another example of a threaded retention arrangement includes a set screw arrangement in which the outer support element 25 has an opening 51 through the side portion 33 for receiving a screw 54 which has threads 56 which can be threaded into mating apertures 58 formed in the surface of opening 51. The screw 54 is tightened until sufficient contact with the cutting element 20, in particular substrate 24, is achieved to retain cutting element 20 in the outer support element 25.

In one or more embodiments, the cutting element may be attached to the outer support element by a press fit arrangement wherein the cavity of the outer support element has a slightly smaller size than the corresponding portion of the cutting element to be positioned therein.

In one or more embodiments, the cutting element may be attached to the outer support element by a shrink fit arrangement wherein the outer support element has a different coefficient of thermal expansion than the corresponding portion of the cutting element to be positioned therein such that upon cooling the cutting element is immovably attached to the outer support element.

Figure 6:
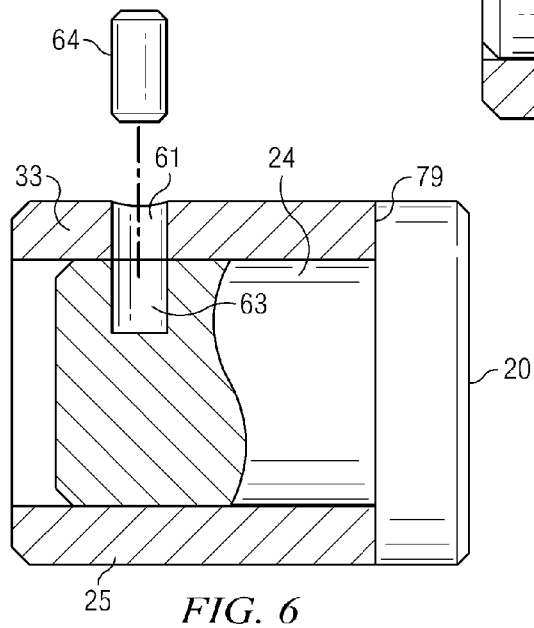
FIG. 6 shows a cross-sectional view of a cutter assembly according to one or more embodiments of the present disclosure.
Figure 31:
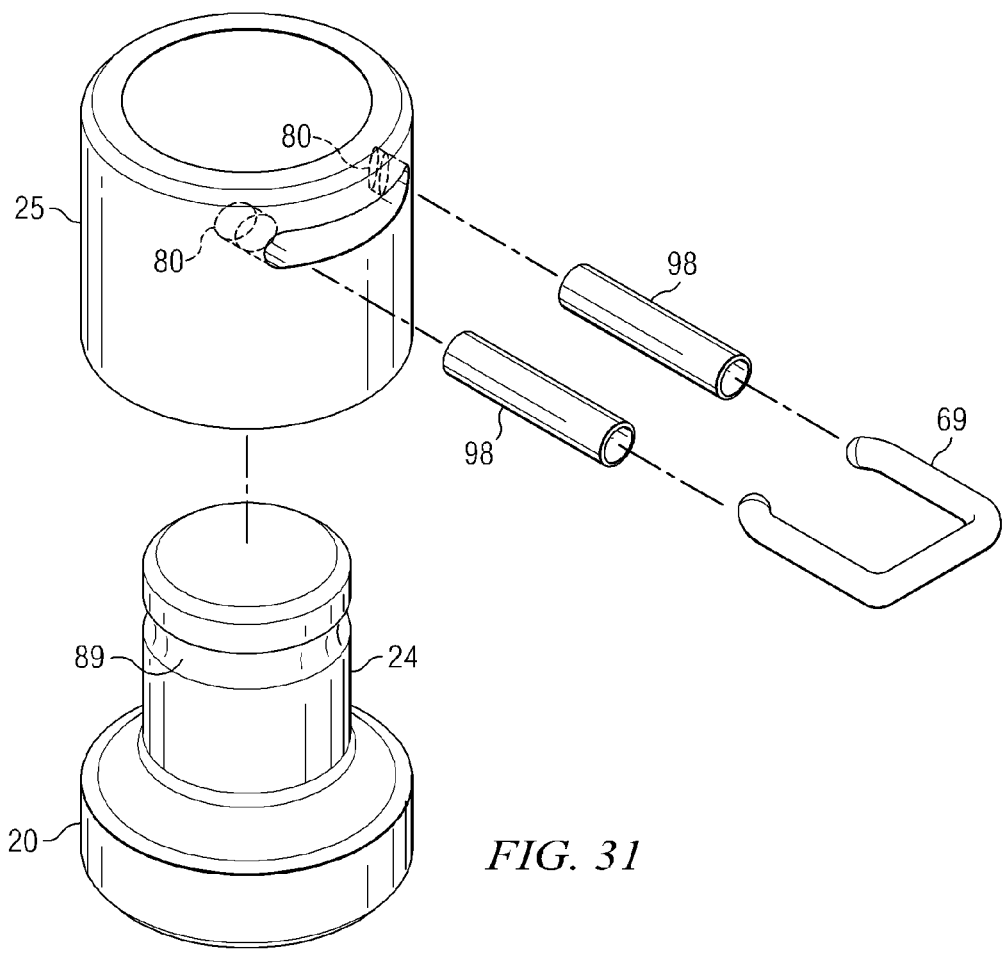
FIG. 31 shows a perspective view of a cutter assembly according to one or more embodiments of the present disclosure.

In one or more embodiments, the cutting element may be attached to the outer support element by a set pin arrangement, as shown in FIG. 6, in which the outer support element 25 has an opening 61 through the side portion 33 and cutting element 20, in particular substrate 24, also may have an opening 63, for receiving a pin 64 which is fitted through opening 61 transversely through side portion 33 of outer support element 25 and penetrates opening 63 formed in substrate 24. Pin 64 can be press fit, soldered, and/or brazed into openings 61 and 63. Additional configurations of set pin arrangements are illustrated in FIGS. 20, 21, 22 and 31, described herein. In one or more embodiments, the pin may be a dual-pronged pin 69, as shown in FIG. 22, and the outer support element 25, may have a recess 88 so the upper portion of pin 69 is recessed to provide additional protection from the drilling conditions. Groove 89 is provided in substrate 24 to accommodate the pin ends. FIG. 31 illustrates the use of one or more tubular sleeves 98 positioned within cavities 80 between the outer support element 25 and the pin 69. The tubular sleeve may be formed from any suitable material.

Figure 30:
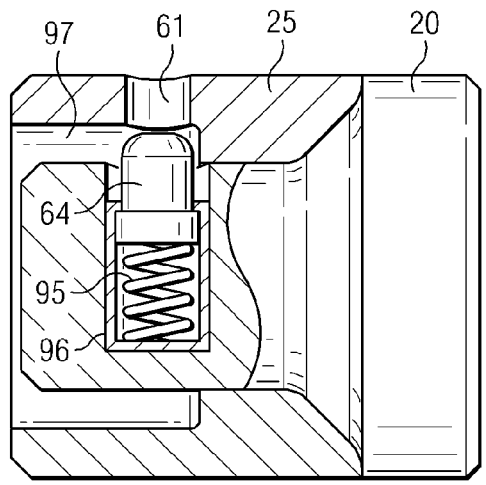
FIG. 30 shows a cross-sectional view of a cutter assembly according to one or more embodiments of the present disclosure.

In one or more embodiments, a pin may be used in combination with a spring, as shown in FIG. 30, such that the pin is spring loaded with sufficient retention force to retain the cutting element within the outer support element during use. As depicted in FIG. 30, a spring loaded arrangement includes pin 64 positioned within a pin housing 96 with a spring 95 disposed between pin 64 and pin housing 96. Pin 64 expands into recess 97 thereby retaining cutting element 20 within the outer support element 25. Opening 61 may be utilized to depress pin 64 for removal of cutting element 20 from outer support element 25. The pins may be formed of any suitable material capable of retaining the cutting element within the outer support element, for example a shape memory alloy which "remembers" its original, cold forged shape (e.g., silver-based alloys, gold-based alloys, iron-based alloys, copper based alloys, and nickel-based alloys such as silver-cadmium alloys, gold-cadmium alloys, copper-zinc-aluminum-nickel alloys, copper-aluminum-nickel alloys, and nickel-titanium alloys) or non-shape memory alloys which may include steel alloys (e.g., carbon steel alloys, tool steel alloys, stainless steel alloys, etc.), copper-based alloys, nickel-based alloys, cobalt-based alloys, aluminum-based alloys, titanium-based alloys, gold-based alloys, silver-based alloys (including silver-based braze alloys such as BAG-7, BAG-22, etc. which allows for removal of the cutting element by heating), ceramic materials (for example ceramic materials with low porosity, such as sintered aluminum oxide, or zirconium stabilized with Yttrium), and cermet materials (which may include metals such as nickel, cobalt, iron and mixtures and alloys thereof).

Figure 7:
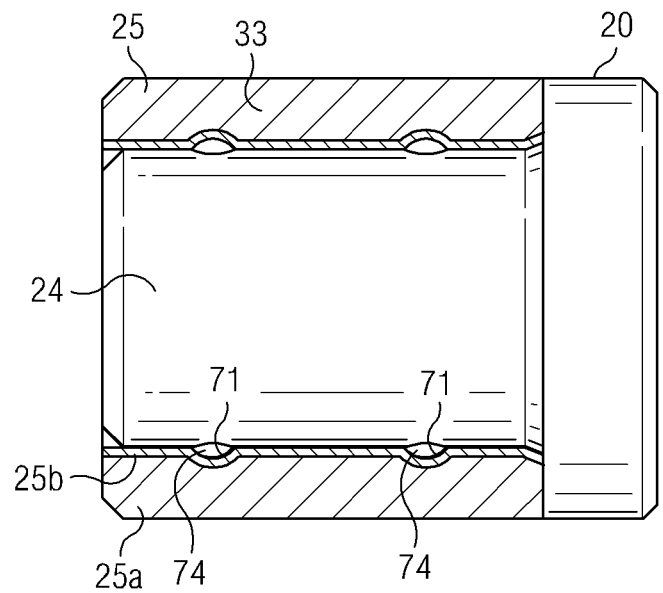
FIG. 7 shows a cross-sectional view of a cutter assembly according to one or more embodiments of the present disclosure.

In one or more embodiments, the cutting element may be attached to the outer support element by a protrusion with mating cavity arrangement. As shown in FIG. 7, cutting element 20, in particular substrate 24, may have one or more protrusions 74 formed in the outer surface and the outer support element 25 has mating cavities 71 formed on the inner surface of side portion 33 which cooperate to immovably secure cutting element 20 to outer support element 25. One skilled in the art would appreciate this is but one example and the protrusions and mating cavities may be of any suitable shape and size. In this embodiment, it is preferred that the outer support element have at least two regions: region 25a of any composition as described herein for the outer support element, for example a tungsten carbide-cobalt material, and region 25b consisting of a metal or metal alloy as described herein, for example a steel alloy. One skilled in the art would also appreciate that such cutter assemblies may have an outer support element formed from two or more segments which are attached with the cutting element positioned within the segments. Thus, the cutting element may be present when the outer support element is brazed to the cutter pocket.

In one or more embodiments, the cutting element may be attached to the outer support element utilizing two or more protrusions. As shown in FIG. 23A, the outer support element 25 has two protrusions 72 (spaced 180 degrees apart) and an opening 70 in the side surface to vent any trapped gases. As shown in FIG. 23B, cutting element 20 has a substrate 24 containing two protrusions 73 on the outer surface of the substrate to be disposed within the outer support element 25. FIG. 23C illustrates a cross-sectional view of the cutter assembly with second material 75 used in combination with the protrusions 72, 73 to bond the cutting element 20 to the outer support element 25. It is understood that any number of protrusions may be used and the present embodiment is not meant to be limited to the arrangement illustrated in FIGS. 23A-C, for example at least 2, at least 3 or at least 4 protrusions may be used. The protrusions are arranged such that the direction of rotation to lock the protrusions can be set to complement the direction of rotation of the downhole tool (e.g., drill bit) so that the cutting elements are not loosened by the cutting action of the downhole tool.

In one or more embodiments, as shown in FIG. 23D, the bottom segment 76 may be formed separately from the side segment 33 of the outer support element 25. The two segments may be attached by any method capable of bonding the two segments together, for example a braze material and/or mechanical locking mechanism as discussed above (e.g., one or more mating protrusions and cavities press fit together). In one or more embodiments, a braze material used to attach the segments 33, 76 together may suitably have a melting temperature that is higher than the melting temperature of the first braze material used to attach the outer support element to the cutter pocket. The bottom segment 76 may have the same composition as side segment 33 or may have a different composition.

In one or more embodiments, the cutting element may be attached to the outer support element utilizing two or more protrusions and two or more grooves. As shown in FIGS. 24A-C, outer support element 25 contains three protrusions 72 (only two of which are shown) on the inner surface of the outer support element and which are spaced 120 degrees apart. Cutting element 20 has a substrate 24 which contains three matching grooves 77 (only one of which is shown) which allows the cutting element 20 to be placed within the cavity of the outer support element 25 and rotated to be mechanically locked into place within the outer support element 25. Alternatively, the grooves may be formed in the inner surface of the outer support element and the protrusions formed in the substrate of the cutting element. The grooves are arranged such that the direction of rotation to lock the protrusion into the corresponding grooves can be set to complement the direction of rotation of the downhole tool (e.g., drill bit) so that the cutting elements are not loosened by the cutting action of the downhole tool. It is understood that any number of protrusions and grooves may be used and the present embodiment is not meant to be limited to the arrangement illustrated in FIGS. 24A-C, for example at least 2, at least 3 or at least 4 protrusions and corresponding grooves may be used. Although not illustrated, it is understood that a second material may be additionally used to bond the cutting element to the outer support element. In one or more embodiments, as shown in FIG. 24C, the cutter assembly may also include a disc or washer 78 positioned adjacent the bottom of the substrate 24. Such washer or disc may be used to help secure the cutting element to the outer support element, for example by providing an additional retention force to assist in maintaining the protrusions 72 within grooves 77. Such washer or disc may be a metal or metal alloy. For example, the washer or disc may comprise a metal or metal alloy which has been magnetized. The washer or disc may be compressible such that once the cutting element is positioned within the outer support element the washer or disc can provide a retention force in an outwardly direction towards the cutting face or the washer or disc may be magnetized providing a retention force in an inwardly direction opposite the cutting face. The washer or disc may also absorb impact forces as the tool is used in a drilling application and can help improve the braze strength.

Figure 18A:
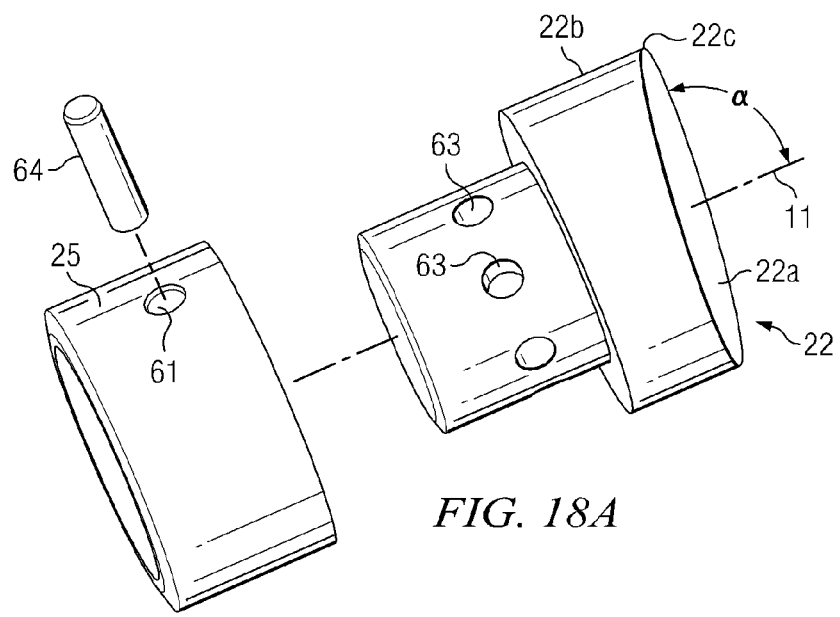
FIG. 18A shows a perspective view of a cutter assembly according to one or more embodiments of the present disclosure.

In one or more embodiments, the cutting element and outer support element may be configured to form an indexable cutter assembly such that a specific portion of the ultrahard material layer (end face, side and peripheral edge) may be aligned to engage the earthen formation during use. For example, as shown in FIG. 18A, outer support element 25 has an opening 61 (hole/cavity) formed transversely through side portion 33 of outer support element 25 and multiple matching openings 63 (holes/cavities) formed in the portion of the cutting element 20. The number of positions depends on the number of openings 63 formed in the substrate 24 of cutting element 20. For example, the substrate may have two or more openings or positions, three or more openings or positions, four or more openings or positions, or six or more openings or positions. Pin 64 penetrates into one of the openings 63 formed in substrate 24 at the desired position. Pin 64 can be press fit, soldered, and/or brazed with a low temperature braze material into openings 61 and 63.

As shown in FIG. 20, the pin 64 may be provided with a cap 68 to assist with removal of the pin during rebuilding of the tool. As shown in FIG. 21, pin 64 may penetrate through the substrate 24 via an opening in the cutting element and a filler material 87 used to cover pin 64. Such filler materials may include a solder material, an adhesive, a braze material (e.g., a low temperature braze material), a plug (including a plug with a threaded retention mechanism), an epoxy resin, etc.

One skilled in the art, based on the teachings of the present disclosure, would appreciate that other attachment mechanisms may be used other than a set pin type arrangement, for example those described herein. In one or more embodiments, the attachment mechanism may be capable of being removed to allow for the cutting element to be rotated or indexed such that a different portion of the ultrahard material layer may be used to contact (shear) the formation. The end face of the ultrahard material layer may be planar and perpendicular to the central longitudinal axis of the cutting element.

Figure 18B:
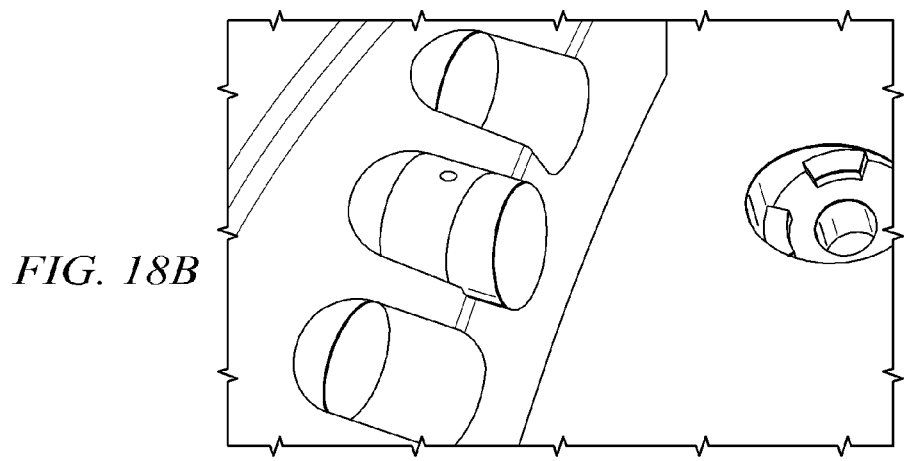
FIG. 18B shows a partial perspective view of a fixed cutter drill bit with the cutter assembly of FIG. 18A attached thereto.
Figure 18C:
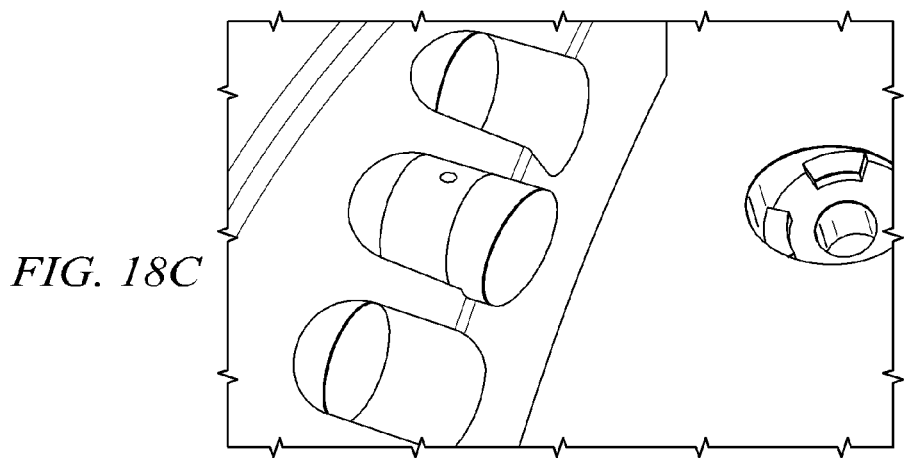
FIG. 18C shows a partial perspective view of a fixed cutter drill bit with the cutter assembly of FIG. 18A attached thereto.

Alternatively, as shown in FIG. 18A, the end face 22a may be canted or angled with respect to the central longitudinal axis 11 of the cutting element. The angle a formed between the cutting face 22a proximate the cutting edge (portion which will engage the formation during use) and line parallel to the central longitudinal axis 11 may be in the range of from 45 degrees to 135 degrees, for example from 65 degrees to 115 degrees. By indexing or rotating the cutting element the back rake and/or side rake may be changed. The back rake may be varied from a positive back rake to a negative back rake, for example the back rake may vary ±45 degrees, ±35 degrees, ±20 degrees or ±15 degrees, for example from −15 degrees to +35 degrees. FIG. 18B illustrates the back rake of a cutting element within a cutter assembly provided on a fixed cutter drill bit. The side rake may be varied from 0 to 45 degrees, for example the side rake may vary ±45 degrees, ±35 degrees, ±30 degrees, ±20 degrees or ±15 degrees. FIG. 18C illustrates the side rake of a cutting element within a cutter assembly provided on a fixed cutter drill bit.

As is known in the art, back rake may generally be defined as the angle formed between the cutting face of the cutting element and a line that is normal to the formation material being cut. FIG. 25 shows a cutting element held at an angle in a tool body 83 for cutting into a formation. The cutting element 82 includes a diamond layer 22 affixed to a substrate 38 that is mounted on a tool body. Generally speaking, the back rake angle "A" is used to describe the working angle of the end face 22a of the cutting element. FIG. 26 illustrates a negative back rake angle "A" of a cutting element 82 and FIG. 27 illustrates a positive back rake angle "A" of a cutting element 82.

Figure 28A:
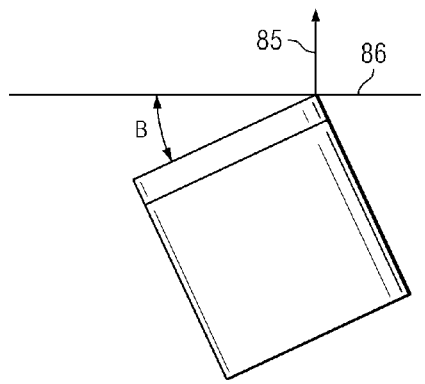
FIGS. 28A-C illustrate side rake angles for a cutting element.
Figure 28B:
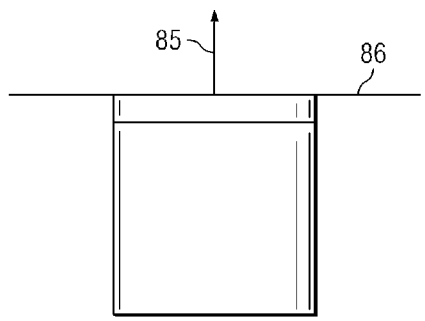
Figure 28C:
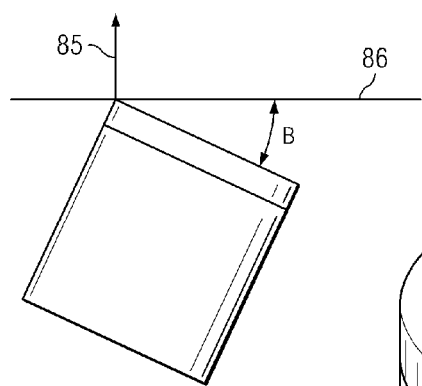

As is known in the art, side rake may generally be defined as the angle formed between the cutting face 22a and a plane 86 perpendicular to a vector 85 in the direction of motion of the tool, as shown in FIGS. 28A, 28B and 28C. FIG. 28A illustrates a negative side rake angle "B". FIG. 28B illustrates a zero side rake angle where the cutting face is perpendicular to vector 85. FIG. 28C illustrates a positive side rake angle "B".

Figure 29A:
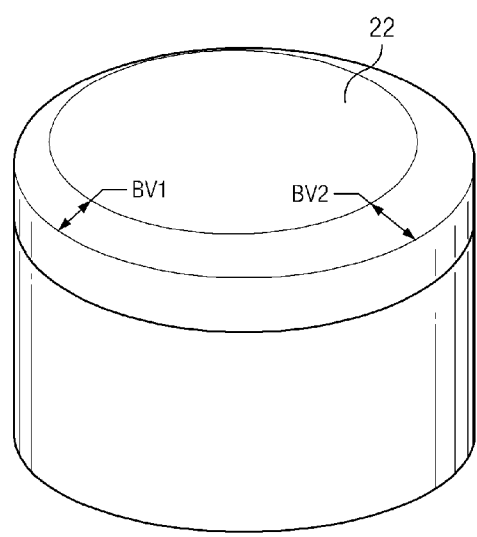
FIG. 29A shows a perspective view of a cutting element with different bevels.
Figure 29B:
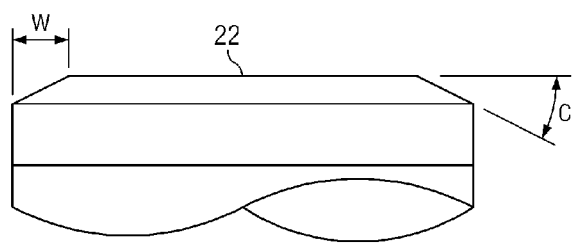
FIG. 29B shows a partial cross-sectional view of the cutting element of FIG. 29A.

In addition, or alternatively, at least a portion of the peripheral edge of the ultrahard material layer may have a beveled edge. The beveled edge may be varied along the peripheral edge such that as the cutting element is indexed a different bevel angle and/or bevel width may be used to engage the earthen formation. As shown in FIG. 29A, a first bevel "BV1" may be found along a first portion of the peripheral edge 22c of the diamond layer 22 and a second bevel "BV2" may be found along a second portion of the peripheral edge 22c. The bevel angle "C" is the angle formed between the beveled edge surface and a line parallel to the central longitudinal axis 11 of the cutting element, as shown in FIG. 29B. The bevel angle may vary from 0 to 80 degrees, for example 5, 10, 15, 20, 25, 30, 35, 40, 45, 50, 55, 60, 65, 70, or 75 degrees. The width "w" of the bevel (as shown in FIG. 29B) may vary from 0 to 0.05 inches (0 mm to 1.25 mm), for example 0.006 inches (0.15 mm), 0.01 inches (0.25 mm), 0.012 inches (0.3 mm), 0.014 inches (0.35 mm), 0.016 inches (0.4 mm), 0.018 inches (0.45 mm), 0.02 inches (0.5 mm), 0.025 inches (0.6 mm), 0.03 inches (0.75 mm), or 0.04 inches (1 mm).

In this embodiment as well as other embodiments disclosed herein, the ultrahard material layer of the cutting element may have a non-planar end face. The non-planar end face may be symmetrical about the central longitudinal axis or may be asymmetric. In this embodiment, such non-planar end faces may also be used to vary the back rake and/or side rake angles as the cutting element is rotated/indexed. Examples of such non-planar ultrahard material layers are described in U.S. Patent Application Nos. 2005/0269139A1 and 2008/0006448A1, which descriptions of non-planar end faces are incorporated by reference in their entirety.

Figure 19A:
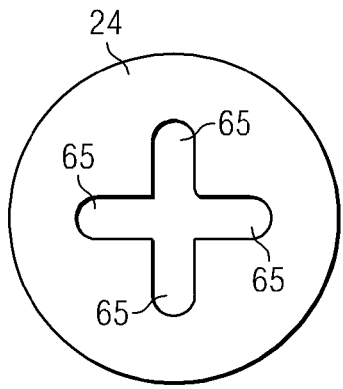
FIG. 19A shows a partial bottom view of a cutting element according to one or more embodiments of the present disclosure.

In one or more embodiments, the indexable arrangement may comprise one or more projections and mating cavities to orient the cutting element within the outer support element. For example, as shown in FIG. 19A, the bottom surface of the cutting element substrate is shown which contains four lobes 65 as projections to provide four different positions for the cutting element. Although not shown, the bottom of the outer support element or cutter pocket has complementary cavities to receive the lobes therein. In alternative embodiments, the lobes may be formed in the bottom of the outer support element or cutter pocket and the cavities provided in the bottom of the substrate. Although depicted using four lobes, the present embodiment is not meant to be so limited and may provide for any number of multiple positions as described hereinbefore.

Figure 19B:
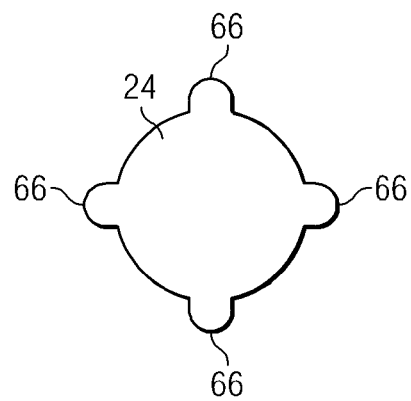
FIGS. 19B-C shows a schematic of a top view of the outer support element and a partial bottom view of the cutting element according to one or more embodiments of the present disclosure.
Figure 19C:
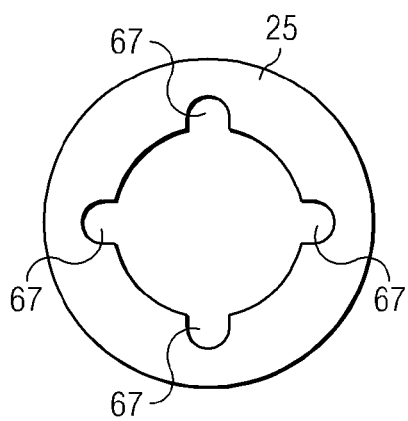

In another example, as shown in FIGS. 19B and 19C, the one or more projections/mating cavities may be as follows: the side surface of the substrate 24 has four splines 66 and the outer support 25 has four mating cavities 67 in the inner surface to provide four different positions for the cutting element. In alternative embodiments, the splines may be provided on the inner surface of the outer support element and the cavities provided in the outer side surface of the substrate. Although depicted using four splines, the present embodiment is not meant to be so limited and may provide for any number of multiple positions as described hereinbefore.

Figure 19D:
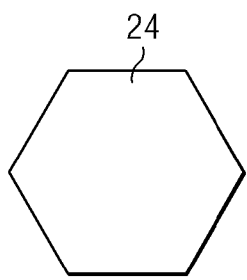
FIG. 19D-E shows a schematic of a top view of the outer support element and a partial bottom view of the cutting element according to one or more embodiments of the present disclosure.
Figure 19E:
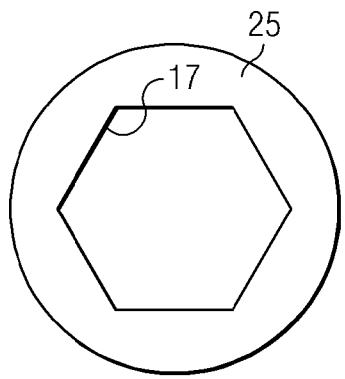

In another example, the outer surface of the substrate 24 of the cutting element and the inner surface of the outer support element 25 may be formed in a mating polygonal shape to provide for different positions of the cutting element. As shown in FIGS. 19D and 19E, the outer surface of the substrate 24 has a hexagonal shape and the inner surface 17 of the outer support element 25 has a complimentary hexagonal cavity. Such an arrangement provides for 6 different cutting element positions. Although depicted using six sides, the present embodiment is not meant to be so limited and may provide for any number of multiple positions as described hereinbefore.

It is within the scope of the present disclosure that in some embodiments, the tool body may be configured to act as the outer support element, i.e., inserting at least a portion of the cutting element into one or more cavities formed within the tool body. Such cavities in the tool body may be formed using a displacement in the mold or may be machined in the tool body. For example, the outer support element in the indexable cutter assembly may be provided by the tool body.

An advantage of using an indexable cutter assembly is that the downhole tool may be rebuilt on site at the drilling location and the design of the tool changed without having to alter the tool body, for example the bevel size, side rake, back rake, etc. can be easily changed. One skilled in the art, based on the teachings of the present disclosure, would appreciate that the design changes may be varied based upon the particular formation to be drilled by the tool.

One skilled in the art would also appreciate that more than one mechanical locking mechanism, a combination of different mechanical locking mechanisms or a combination of mechanical locking mechanisms and material bonding mechanisms may be used to attach the cutting element to the outer support element.

In one or more embodiments, the cutting element may be immovably attached to the outer support element by material bonding mechanisms, for example using a reactive material, an adhesive, a solder material, a braze material, and combinations thereof. One skilled in the art based on the teachings of the present disclosure would appreciate that any combination of mechanical locking mechanisms and material bonding mechanisms may be used to attach the cutting element to the outer support element.

In one or more embodiments, the cutting element may be immovably attached to the outer support element using a second material. The second material may be any material capable of immovably attaching (bonding) the cutting element to the outer support element. Such materials may include, but are not limited to, reactive materials, adhesives, soldering materials, and braze materials.

In one or more embodiments, the reactive material may be any chemical agent capable of reacting with the surfaces of the outer support element and cutting element to form a bond. Suitably, the chemical agent reacts with the cutter assembly components but does not significantly damage them. Such materials may be applied to the inner surface of the outer support element and/or the outer surface of the cutting element to be positioned adjacent (e.g., within) the outer support element and subjected to conditions sufficient to react the chemical agent bonding the surfaces together.

In one or more embodiments, the adhesive may be any adhesive capable of attaching (bonding/gluing) the cutting element to the outer support element. Suitable adhesives may include cyanoacrylate-based adhesives such as methyl-2-cyanoacrylate, ethyl-2-cyanoacrylate, n-butyl cyanoacrylate, and octyl-2-cyanoacrylate. Cyanoacrylate-based adhesives are sometimes known as "instant glues". Suitable adhesives may also include epoxy-based adhesives and silicon-based adhesives.

In one or more embodiments, the soldering material may be any soldering material capable of attaching (bonding) the cutting element to the outer support element. Suitable soldering materials may include any metal alloys having a melting temperature below 1000° F. (538° C.), suitably 850° F. (454° C.) or less. For example, metal alloys typically used as soldering alloys may include, but are not limited to, lead-, magnesium-, cadmium-, gallium-, thallium-, indium-, or silver-based alloys. Suitably the base metal may be cadmium or silver. Soldering alloys may also include as other constituents at least one of tin, copper, zinc, titanium, zirconium, nickel, manganese, tellurium, selenium, antimony, bismuth, gallium, cadmium iron, silicon, phosphorous, sulfur, platinum, palladium, silver, lead, magnesium, germanium, carbon, oxygen, as well as other elements. Suitably, the soldering material may be an alloy of silver and cadmium. For example, Cd—Ag alloys (cadmium-silver alloys) such as BRAZE™ 053 (TEC) comprising 95% w Cd and 5% w Ag from Lucas-Milhaupt, Inc. (Cudahy, Wis.) and BRAZE™ 056 (TEC) comprising 78.4% w Cd, 16.6% w Zn (zinc) and 5% w Ag also from Lucas-Milhaupt, Inc.

In one or more embodiments, the braze materials for the second material may be any braze material capable of attaching (bonding) the cutting element to the outer support element. Suitable braze materials for the second material may be selected from the braze materials described for the first braze material, discussed hereinafter. The second braze material may be the same as the first braze material. Alternatively, the second braze material may differ from the first braze material. Preferably, the second braze material may include silver-based alloys having a braze temperature of less than 700° C. (low temperature braze materials). In a particular embodiment, a Ag—Cu—Zn—Sn—Ga alloy (such as BRAZETEC 5662 from Umicore BrazeTec (Glens Falls, N.Y.)) or a Ag—Cu—Zn—Sn alloy (such as BAg-7 available from Silvaloy (Warwick, R.I.) under A56T) may be used as the low melting temperature (low braze temperature) second braze material to attach the cutting element to the outer support element.

Figure 8:
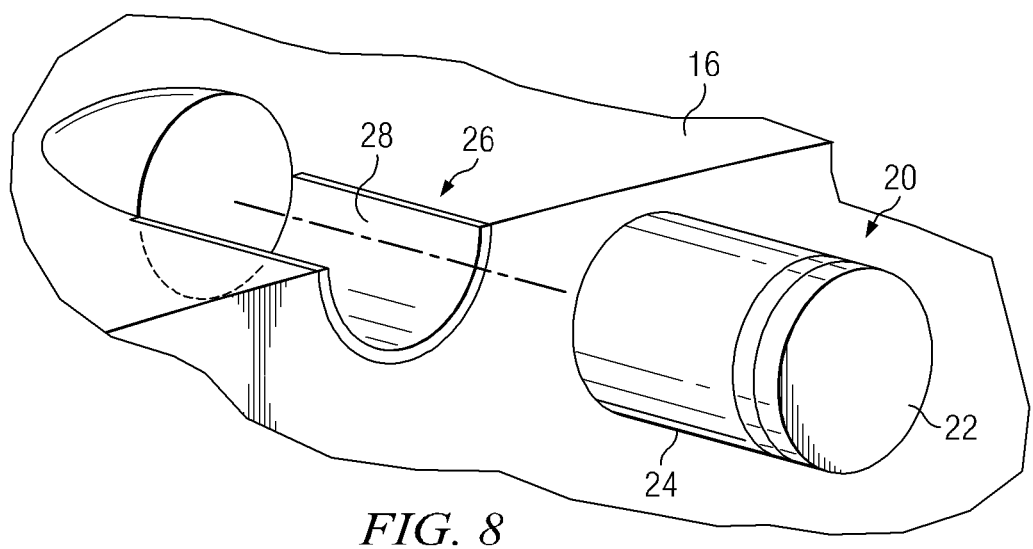
FIG. 8 shows a perspective view of a cutting element secured to a cutter pocket in a conventional manner.

As shown in FIG. 8, a cutting element 20 is conventionally secured to the cutter pocket 26 by brazing, whereby heat and a braze alloy 28 are used to join the cutting element 20 to the blade 16 in the cutter pocket 26. During brazing, braze materials (generally defined as alloys having a melting temperature above 850° F. (454° C.), but less than the components to be joined) are heated above their melting point, and once in molten form, are distributed between the two components to be joined by capillary action. The components are joined (attached) when the molten braze material cools and hardens. As the base components to be joined are not melted by brazing, they typically retain most of their physical properties and the danger of metal distortion or warping, associated with welding, is minimized. Also, unlike soldering, brazing provides a strong metallic bond between the braze alloy and components being joined. The melting range for a brazing alloy is defined by the minimum temperature at which the alloy will start to melt ("solidus") and the temperature at which the alloy is 100% liquid ("liquidus"). In the present disclosure, reference to melting temperatures is meant to refer to the liquidus temperatures. For most purposes, the actual brazing temperature is 50° F. to 200° F. (30° C. to 110° C.) above the liquidus temperature. Thus, reference to specific temperatures may refer to the braze temperature, and not just a melting temperature, in particular, as it is the braze temperature which is necessary to form a braze. Similarly, specific temperatures may refer to the soldering temperature, and not just a melting temperature, as it is the soldering temperature which is necessary to form a solder. However, reference to melting temperatures may generally refer to whether a material melts at, and thus requires, a higher or lower applied temperature (braze or solder temperature).

Figure 9:
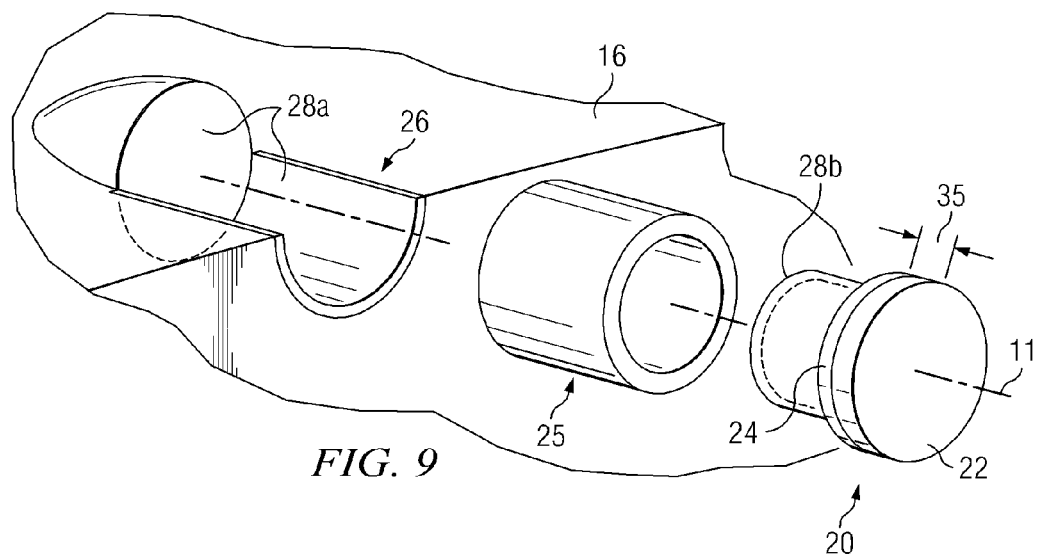
FIG. 9 shows a perspective view of a cutter assembly to be secured to a cutter pocket according to one or more embodiments of the present disclosure.

As shown in FIG. 9 in accordance with one or more embodiments of the present disclosure, a first braze material 28a is placed in the cutter pocket 26 formed in blade 16 and the outer support element 25 is attached by brazing, whereby heat and the braze alloy 28a are used to join the outer support element to the bit in its cutter pocket. A second material 28b is placed on the outer surface of the substrate 24 and the cutting element 20 is attached to the outer support element 25. Suitably, the second material is a second braze material such that the cutting element 20 is attached by brazing, whereby heat and the braze alloy 28b are used to join the cutting element to the outer support element in its cutter pocket 26 on the bit blade. One skilled in the art would appreciate that the first braze material may additionally (or alternatively) be placed on the outer surface of the outer support element and the second material may additionally (or alternatively) be placed on the inner surface of the outer support element and optionally the mating end face of the outer support element to the cutting element.

In an example embodiment, a bit body may be machined from a steel bar stock having at least one cutter pocket formed thereon. Displacements may be placed in the cutter pockets and a wear resistant coating (e.g., hardfacing, thermal spray coatings, etc.) may be applied to the outer surface of the steel bit body. The displacements may be removed and the outer support element may be brazed thereto using a first braze material, as discussed herein. The cutting element may be immovably attached using one or more of the mechanisms described herein.

In another example embodiment, the bit body may be machined from a steel bar stock having at least one cutter pocket formed thereon and the outer support element may be brazed within the cutter pocket utilizing a first braze material. However, the wear resistant coating in this embodiment may subsequently be applied to at least a portion of the bit body (i.e., after brazing the outer support element). Preferably, in this embodiment, the wear resistant coating may be applied to cover the bit body (e.g., the blades), first braze material and optionally the outer support member. Reference is made to U.S. Pat. Nos. 6,772,849 and 7,373,997, which describe wear resistant coatings and are incorporated herein by reference. Preferably, the outer support element may comprise a steel material when the wear resistant coating is desired over the outer surface of the outer support element. When using a hardfacing material for the wear resistant coating, the first braze material may preferably have a greater melting point than the metal alloy used in the hardfacing material. This embodiment results in fewer cracks formed in the wear resistant coating since the outer support is brazed into the cutter pocket prior to applying the wear resistant coating and the cutting element may be subsequently attached to the outer support element using much lower temperatures. Additionally, this embodiment provides improved protection for the braze material while reducing the thermal exposure of the cutting element (protecting the diamond table) and improves the ease of manufacturing by removing the opportunity for contamination of the cutter pocket when applying a wear resistant coating prior to brazing the outer support element to the steel body drill bit.

In one or more embodiments, the bit body may be machined from a steel bar stock having at least one cavity machined therein, thus, having the bit body provide the outer support element for attaching the cutting element. Suitably, the cavity may be machined along the leading side of the tool body (e.g., blade) such that the cutting element shears the formation. At least a portion of the bit body may be coated with a wear resistant coating (described above), suitably at least the upper blade surface. The cutting element may be immovably attached using one or more of the mechanisms described herein. This embodiment can provide for improved protection as no first braze material is used since the outer support element is integral with the bit body. Thus, there is no braze material exposed to the upper surface of the bit body to be subjected to the erosive hydraulic fluid pathways.

Figure 10:
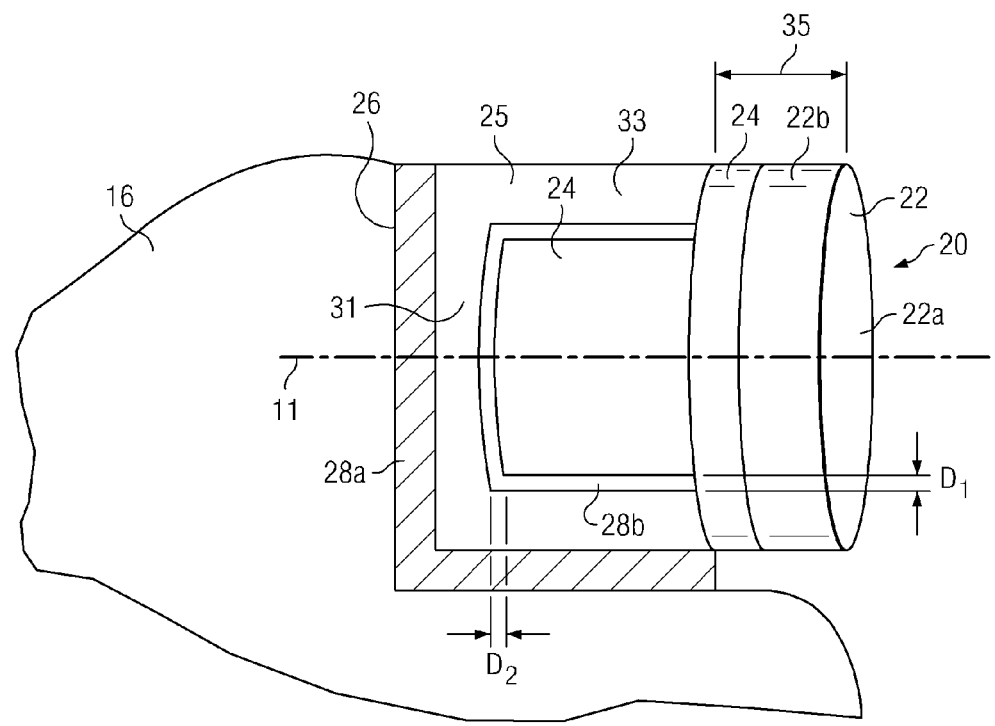
FIG. 10 shows a cross-sectional view of a cutter assembly secured to a cutter pocket according to one or more embodiments of the present disclosure.

Referring to FIG. 10, an illustration and a partial cross-sectional view of a cutter assembly including cutting element 20 brazed in an outer support element 25 in accordance with one or more embodiments of the present disclosure is shown. As illustrated in FIG. 10, the outer support element 25 is inserted in the cutter pocket 26 of the blade 16 and attached therein by brazing a first braze material 28a. The outer support element has a bottom portion 31 and a side portion 33. One skilled in the art, based on the teachings of the present disclosure, would appreciate that bottom portion 31 may not be present and side portion 33 may have a different shape and may also be formed from more than one segment, as discussed hereinafter. A base portion of the substrate of the cutting element 20 is inserted in the outer support element 25 and attached therein by a second material 28b, for example a braze material. The outer support element is positioned a select distance 35 behind the cutting face 22a and extends to substantially the same radial distance from the central longitudinal axis 11 of the cutting element 20 as the side surface 22b of the ultrahard material layer 22. Suitably, the select distance may be such that the exposed portion of the cutting element includes both a portion of the substrate extending behind the interface and the ultrahard material layer.

In the embodiment shown, the cutting assembly is brazed into cutter pocket 26 with two braze alloys 28a and 28b, whereas a cutting element 20 is conventionally brazed into a cutter pocket 26 using only a single braze alloy type (as shown in FIG. 8). In the embodiments shown in FIG. 10, braze alloy 28a is positioned in the space between outer support element 25 and cutter pocket 26 and braze alloy 28b is positioned in the space between cutting element 20 and outer support element 25 to jointly attach the cutting assembly in place. Braze alloys 28a and 28b may differ in composition and may be selected based on their melting temperatures (and respective braze strengths).

In one or more embodiments, for example as illustrated in FIG. 10, the outer support element 25 and the substrate of cutting element 20 have been molded and/or machined such that there is a substantially uniform distance between the inner surface of the outer support element 25 and the outer surface of the substrate of the cutting element 20 along the sides (as depicted by distance "$D_1$") and optionally rearward (as depicted by distance "$D_2$"). The distance between the inner surface of the outer support element 25 and the outer surface of the substrate of the cutting element 20 may be in the range of from 0.002 to 0.020 inches (0.025 mm to 0.51 mm), suitably in the range of from 0.002 to 0.010 inches (0.025 mm to 0.25 mm), more suitably in the range of from 0.002 to 0.006 inches (0.025 mm to 0.15 mm).

Figure 11A:
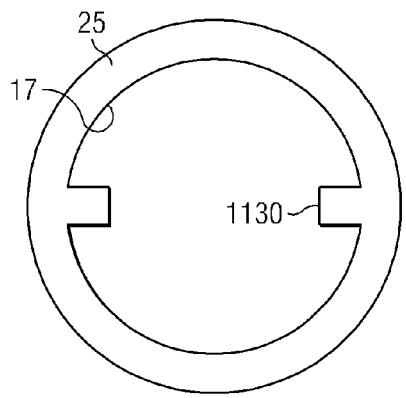
FIGS. 11A-11B shows a schematic of a top view of the outer support element and a partial bottom view of the cutting element according to one or more embodiments of the present disclosure.
Figure 11B:
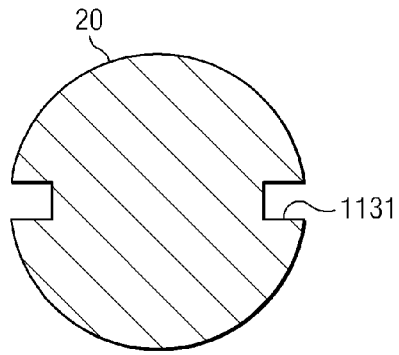

One of ordinary skill in the art would recognize that, although the machined surfaces of the outer support element and the cutting element are depicted as substantially planar, any other geometry or shape may be utilized. For example, the adjacent surfaces between the outer support element 25 and the cutting element 20 may have one or more protrusions (e.g., spines) 1130 along the inner surface 17 of the outer support element 25 with mating cavities 1131 formed along the outer surface of the cutting element 20 (e.g., the substrate) which is positioned within the outer support element 25, as shown by the top view of the outer support element and the bottom view of the cutting element 20 in FIGS. 11A and 11B. Suitably, the spacing between the adjacent surfaces of the outer support element and the cutting element may of a selected distance such that optimum bonding may be provided. As discussed hereinbefore, such uniform spacing can result in improved attachment of the cutting element to the outer support elements which can allow for the use of a larger variety of materials (e.g., materials which typically would not have been used due to their low shear strength) to attach the cutting element to the outer support element.

Brazing of outer support element with the first braze material (e.g., braze alloy 28a) may be accomplished in the following manner. The outer support element may be oriented such that upon attachment of the cutting element the ultrahard material layer is positioned at an appropriate angle so that a curved edge thereof is presented to an earth formation during drilling. After the outer support element is placed into the cutter pocket, the outer support element and the first braze material are heated, typically with a torch, to produce a bond between the outer support element and the cutter pocket on the downhole tool (e.g., the bit body 10). Placement of the first braze material (e.g., braze alloy 28a) may be achieved using braze foils, braze discs, and/or braze rods, as known in the art of brazing. For example, one or more braze discs or foils may be placed along the rear and/or side surfaces of the pocket and/or the outer surface of the outer support element (prior to placement of the outer support element in the cutter pocket) to be melted into place during a subsequent heating. Additionally (and/or alternatively) one or more brazing rods may be used by locating the brazing rod proximal to the space between the cutter pocket and outer support element (after placement of the outer support element in the pocket), which may be melted into place during the application of heat. The cutting element may be immovably attached to the outer support element after the outer support element is attached to the cutter pocket. Alternatively, the cutting element may be immovably attached to the outer support element prior to the outer support element being attached to the cutter pocket. It is a less preferred embodiment to attach the cutting element to the outer support element (using any attachment mechanism) prior to attaching the outer support element to the cutter pocket when using a first braze material having a braze temperature of at least 700° C. as the heat necessary to form a braze with such a first braze material may potentially damage the ultrahard material layer of the cutting element.

In one or more embodiments, attachment of the cutting element to the outer support element utilizes a second material and may be accomplished in the following manner. The cutting element may be placed into the outer support element with a suitable second material to produce a bond between the outer support element and the cutting element on the downhole tool (e.g., the bit body). In one or more embodiments, the second material may be an adhesive, as described hereinbefore. Such adhesive may be placed on at least a portion of the outer surface of the cutting element. Suitably, adhesive may be placed on a majority of the outer surface of the cutting element to be positioned within the outer support element and optionally at least a portion of the cutting element adjacent the end face of the outer support element. Additionally (or alternatively), such adhesive may be placed on at least a portion of the inner surface of the outer support element, suitably a majority of the inner surface of the outer support element and optionally at least a portion of the end face of the outer support element adjacent the cutting element. An advantage of using an adhesive is that the cutting element can be attached to the outer support element after the outer support element is attached to the cutter pocket and the adhesive does not use excessive heat; thus, providing protection to the ultrahard material from heat damage. Further, the combination of an adhesive and substantially uniform spacing between the inner surfaces of the outer support element and the cutting element provides sufficient shear strength to retain the cutting element without having to use conventional braze materials and the associated damaging heat.

In one or more embodiments, the second material may be a soldering material. Placement of solder alloys may be achieved using solder pastes, solder foils, solder discs, and/or solder rods, as known in the art of soldering. For example, one or more solder pastes, discs or foils may be placed along at least a portion of the inner surfaces of the outer support element (prior to placement of the cutting element) which may be melted into place during a subsequent heating. Suitably, one or more solder pastes, discs or foils may be placed along the majority of the inner surface of the outer support element (prior to placement of the cutting element) and optionally at least a portion of the end face of the outer support element adjacent the cutting element. Additionally (or alternatively), such solder material may be placed on at least a portion of the outer surface of the cutting element, suitably a majority of the outer surface of the cutting element, to be positioned within the outer support element and optionally at least a portion of the cutting element adjacent the end face of the outer support element. For example, a sleeve of solder material may be positioned around the outer surface of the cutting element to be positioned within the outer support element. Additionally (and/or alternatively) one or more solder rods may be used by locating the solder rod proximal to the space between the cutting element and the outer support element (after placement of the cutting element in the outer support element), which may be melted into place during with the application of heat. An advantage of using a solder material as the second material is that the cutting element can be attached to the outer support element using much lower temperatures than temperatures conventionally utilized, in particular a furnace instead of a torch can be used to heat the solder material which protects the ultrahard material from damaging temperatures. Thus, the use of a cutter assembly with such materials can protect the ultrahard material layer from damaging temperatures without sacrificing the strength of attachment of the cutter assembly to the downhole tool (e.g., the drill bit).

In one or more embodiments, the second material may be a braze material. Placement of the second braze material (e.g., braze alloy 28b) may be achieved using braze foils, braze discs and/or braze rods, as known in the art of brazing. For example, one or more braze discs or foils may be placed along at least a portion of the inner surfaces of the outer support element (prior to placement of the cutting element) which may be melted into place during a subsequent heating. Suitably, one or more braze discs or foils may be placed along a majority of the inner surface of the outer support element (prior to placement of the cutting element) and optionally at least a portion of the end face of the outer support element adjacent the cutting element. Additionally (or alternatively), such braze material may be placed on at least a portion of the outer surface of the cutting element, suitably a majority of the outer surface of the cutting element, to be positioned within the outer support element and optionally at least a portion of the cutting element adjacent the end face of the outer support element. For example, a sleeve of braze material may be positioned around the outer surface of the cutting element to be positioned within the outer support element. Additionally (and/or alternatively), one or more braze rods may be used by locating the braze rod proximal to the space between the cutting element and the outer support element (after placement of the cutting element in the outer support element), which may be melted into place during with the application of heat. When using a low temperature braze material as the second material, the cutting element can be attached to the outer support element using a furnace instead of a torch which controls and limits the amount of heat the ultrahard material is exposed to; thus, protecting the ultrahard material from damaging temperatures. The use of a cutter assembly with such materials can protect the ultrahard material layer from damaging temperatures without sacrificing the strength of attachment of the cutter assembly to the downhole tool (e.g., the drill bit).

In one or more embodiments, a high melting temperature (high braze temperature) braze material may be used to attach the outer support element to the cutter pocket. In some embodiments, the high temperature first braze material may be placed along the cutter pocket rear surface (corresponding to the bottom surface of the outer support element and the bottom surface of the substrate if the outer support element does not include a bottom portion) in the space between the rear surface of cutter pocket and the bottom portion of the outer support element, and optionally, the substrate of the cutting element if present during attachment of the outer support element and if the outer support element does not include a bottom portion. In this embodiment, the first braze material is heated and allowed to flow into a portion of the space between the cutter pocket side surface and the outer support element side surface. Alternatively, the high temperature first braze material may be placed along the rear surface and at least a portion of the side surface, preferably the entire side surface.

In a particular embodiment, a high melting temperature brazing alloy disc may be placed to bond the rear surface of cutter pocket to the corresponding rear surface of outer support element and optionally the rear surface of the substrate of the cutting element if present during attachment of the outer support element (if the outer support element does not include a bottom portion). A high melting temperature brazing alloy rod may be used to braze the corresponding side surfaces of outer support element to the cutter pocket. Additionally, it may be desirable to heat such high melting temperature (high braze temperature) first braze material in the absence of the cutting element, and subsequently attach the cutting element in the outer support element to avoid damage to the ultrahard material layer while providing a high shear strength bond of the outer support element to the downhole tool (e.g., drill bit).

As used herein, the term "conventional brazing" or "low temperature brazing" refers to brazing accomplished with low to moderate temperatures that are not high enough (e.g., braze or melting temperatures less than 700° C.) to damage the ultrahard material layer (e.g., polycrystalline diamond) of the cutting element. The term "high temperature brazing" refers to brazing accomplished with a temperature which is high enough (e.g., braze or melting temperatures of 700° C. or above) to potentially damage the ultrahard material layer of the cutting element if such temperatures were experienced by the ultrahard material layer. Such high temperature brazing alloys can produce bonds having even higher shear strength than conventional brazing alloys.

In particular, conventionally, a single braze alloy having a melting temperature less than about 700° C. (to prevent unnecessary thermal exposure and/or damage to the ultrahard material) is used in attaching cutting elements in cutter pockets. However, in accordance with some embodiments of the present disclosure, multiple braze alloys having differing alloying compositions may be used which results in differing melting temperatures (and braze temperatures) being used to attach the cutting assembly.

In one or more embodiments, a second material of low melting temperature (low braze or solder temperature) braze material may be used to attach the cutting element to the outer support element and a high melting temperature (high braze temperature) first braze material may be used to attach the outer support element to the cutter pocket. A second material of low melting temperature (low braze or solder temperature) material (having a melting temperature (or a braze or solder temperature) lower than the first braze material) in the form of a paste, disc, or foil may be placed in the space between the outer support element and the cutting element, as discussed above. In some embodiments, the outer support element may be brazed into the cutter pocket at the same time as the cutting element is brazed or soldered into the outer support element. The heat applied to the outer support element to braze the high melting temperature first braze material can be sufficient to also braze or solder the low melting temperature (low braze or solder temperature) second material.

In one or more embodiments, the outer support element may be brazed into the cutter pocket first and then the second material (subsequently placed in the space between the cutting element and the outer support element) may be heated to braze or solder the cutting element to the outer support element. In this embodiment, the outer support element may have a bottom portion as well as a side portion. Suitably, the bottom portion may have one or more holes (openings) which traverse the bottom portion and/or the side portion of the outer support element so that any trapped gas (e.g., air) from inserting the cutting element into the outer support element may be vented. The heat applied to braze or solder the low melting temperature second material can be supplied with a furnace as well as a torch. Attaching the cutting element after the outer support element is brazed in the cutter pocket can prevent the ultrahard material layer of the cutting element from experiencing the elevated temperatures which may be used to braze the outer support element to the cutter pocket. Use of a furnace to braze or solder the second material can control and limit the amount of heat the ultrahard material of the cutting element experiences.

The braze material for the first braze material may be any braze material capable of attaching (bonding) the outer support element to the cutter pocket (cavity). Suitable braze materials for the first braze material may be a metal alloy. Metal alloys typically used as braze alloys include, for example, copper, nickel, silver, or gold based alloys. More specifically, base metals may be selected from silver, copper, gold, and nickel, while alloys may also include as other constituents at least one of tin, zinc, titanium, zirconium, nickel, manganese, tellurium, selenium, antimony, bismuth, gallium, cadmium iron, silicon, phosphorous, sulfur, platinum, palladium, lead, magnesium, germanium, carbon, oxygen, as well as other elements. Generally, gold-, nickel-, and copper-based alloys may be used as high braze temperature (and high melting temperature) braze materials, whereas silver-based alloys typically include both high and low melting temperature materials having melting temperatures (and braze temperatures) of less than or at least 700° C. For example, in one or more embodiments, a Ag—Cu—Zn—Sn—Ga alloy (such as BRAZETEC 5662 from Umicore BrazeTec (Glens Falls, N.Y.)) or a Ag—Cu—Zn—Sn alloy (such as BAg-7 available from Silvaloy (Warwick, R.I.) under A56T) may be used as the first braze material which are low temperature braze alloys. For example, in one or more embodiments, a Ag—Cu—Zn—Ni—Mn alloy (such as BAg-22 available from Silvaloy (Warwick, R.I.) under A49Mn) or a Ag—Cu—Zn—Ni alloy (such as BAg-24 available from Silvaloy (Warwick, R.I.) under A50N) may be used as the first braze material which are high temperature (high shear strength) braze alloys. Preferably, the first braze material is a high temperature (high shear strength) braze material, for example a Ag—Cu—Zn—Ni—Mn alloy or a Ag—Cu—Zn—Ni alloy. In one or more embodiments, both the first braze material and the second material may be silver-based braze alloys having different alloy compositions and as a result, different melting and braze temperatures.

While the embodiments described above indicate or illustrate a clear demarcation between the first braze material and the second material, one skilled in the art would appreciate that depending on the way in which the materials are applied, there may be some commingling to form a new alloy(s) when cooled.

While the embodiments described above indicate use of a torch to apply the braze material, it is also within the scope of the present disclosure that in one or more embodiments a furnace may be used. In an example embodiment, a high temperature first braze material may be used to bond the outer support element to the tool body through the use of a vacuum furnace.

Further, while the above embodiment describes use of a braze material having a melting temperature of less than 700° C. to attach the cutting element containing an ultrahard material layer, the specific reference to 700° C. refers to an embodiment in which the ultrahard material layer is polycrystalline diamond, specifically. However, it is within the scope of the present disclosure that cutting elements with other types of ultrahard material layers, such as, thermally stable polycrystalline diamond (formed by removing Group VIII metals from the interstitial regions or using Si/SiC as a catalyzing material) or PCBN may be used in accordance with the embodiments disclosed herein. Depending on the type of material (and the thermal limits of the material), the acceptable melting/braze temperatures for the braze material selected to attach the cutting element may vary. Thus, reference to 700° C. as being the dividing line between low and high melting temperature brazes is illustrative of embodiments using a PCD ultrahard material layer.

Additionally, the present disclosure also equally applies to the use of two, three or more braze materials to attach the outer support element to the cutter pocket and the use of none, one, two, three or more materials to attach the cutting element to the outer support element. Further, while the present disclosure may specifically discuss methods used to attach PDC cutting elements to a fixed cutter drill bit, it is also within the scope of the present invention that the methods disclosed herein be applied to any cutting elements (particularly those including an ultrahard material) used on other types of downhole drilling tools, such as roller cone drill bits, hybrid drill bits, diamond impregnated drill bits, reaming tools, fishing tools, stabilizer blades, milling tools, and hole openers. Thus, the present disclosure equally applies to the attachment of cutting elements to any cutting element support structure of any downhole cutting tool.

In one or more embodiments, the outer support element may be formed from a variety of materials. In one or more embodiments, the outer support element may be formed of a suitable material such as a material comprising a metal carbide and a metal binder which has been formed by such processes as infiltrating the metal binder, hot-pressing, HPHT sintering, ROC (rapid omnidirectional compaction), pneumatic isostatic forging, vacuum sintering, solid state or liquid phase sintering, spark plasma sintering, microwave sintering, gas phase sintering, and hot isostatic pressure sintering. Suitably, the metal of the metal carbide may be selected from chromium, molybdenum, niobium, tantalum, titanium, tungsten and vanadium and alloys and mixtures thereof. Preferably, the metal carbide may be selected from tungsten carbide, tantalum carbide, and titanium carbide. Additionally, various metal binders may be included in the outer support element, such as cobalt, nickel, iron, alloys and mixtures thereof, such that the metal carbide grains are supported within the metallic binder. Additional materials may also be included which include nitrides, carbonitrides, ceramic materials, ultrahard materials, and combinations thereof. Suitably, the metal carbide comprises tungsten carbide. The tungsten carbide may be monotungsten carbide, cast tungsten carbide, cemented tungsten carbide (also referred to as sintered tungsten carbide in the art), and combinations thereof. Further description of such tungsten carbides may be found in U.S. 2009/0120008, paragraphs 43 through 49, which description is incorporated by reference herein.

The particle sizes of the metal carbide used to form the outer support element may also be varied. The metal carbide may be non-spherical (crushed) or spherical. Larger particle sizes of greater than 6 microns, in particular in the range of from 8 to 16 microns may be used. Use of larger particle sizes of the metal carbide may also provide improved fracture toughness. In some example embodiments, the metal carbide used to form the outer support element may comprise extra large spherical particles having sizes in the range of from 60 to 120 mesh (−60/+120 mesh) (125 to 250 microns), suitably from 60 to 80 mesh (−60/+80 mesh) (177 to 250 microns). Such extra large particles are not conventional sizes used to form a substrate of a cutting element. The extra large spherical particles may be uniformly distributed throughout the outer support element or may be located in a region near the outer surface of the outer support element. The extra large spherical particles may provide for improved abrasion and wear resistance without the anticipated decrease in toughness.

Smaller particle sizes of 6 microns or less, in particular in the range of from 1 micron to 6 microns may also be used. Use of smaller particle sizes of the metal carbide may also provide improved wear resistance of the outer support element, in particular improved erosion resistance, and hardness. The particle sizes of the metal carbide may also be multi-modal which may provide outer support elements with various properties. Suitably, the metal carbide particles used to form the outer support element may comprise spherical cemented tungsten carbide. In one or more embodiments, the outer support element may be a tungsten carbide material using a cobalt content ranging from 6 to 13 percent by weight, based on the total weight of the carbide. In some embodiments, the average particle size of the tungsten carbide used to form the outer support element may be in the range of from 1 to 6 microns and the cobalt metal binder may be present in an amount in the range of from 6 to 8% w, based on the total weight of the carbide material.

It is well known that various metal carbide compositions and metal binders may be used, in addition to tungsten carbide and cobalt. Thus, references to the use of tungsten carbide and cobalt are for illustrative purposes only, and no limitation on the type of substrate or outer support element used is intended.

In one or more embodiments, the outer support element may be selected from alloy steels, nickel-based alloys, and cobalt-based alloys. For example, the outer support element may consist of an alloy steel or other metal alloys.

In one or more embodiments, the outer support element may be formed of a different material from the cutting element substrate. As used herein, the term "different" or "differ" is not intended to include typical variations in the manufacture. However, a material may be considered to be different from another material when the concentration or quantity of components varies outside of typical manufacturing variations. In one or more embodiments, the outer support element may be formed of a tungsten carbide-cobalt material containing a lower amount of cobalt than the substrate of the cutting element which is formed of a sintered tungsten carbide-cobalt material. Having a lower amount of cobalt may provide improved erosion resistance compared to the substrate material. Alternatively, the outer support element may be formed of a tungsten carbide-cobalt material containing a higher amount of cobalt than the substrate of the cutting element which is formed of a sintered tungsten carbide-cobalt material. Having a higher amount of cobalt may provide improved toughness and braze strength compared to the substrate material.

Figure 12:
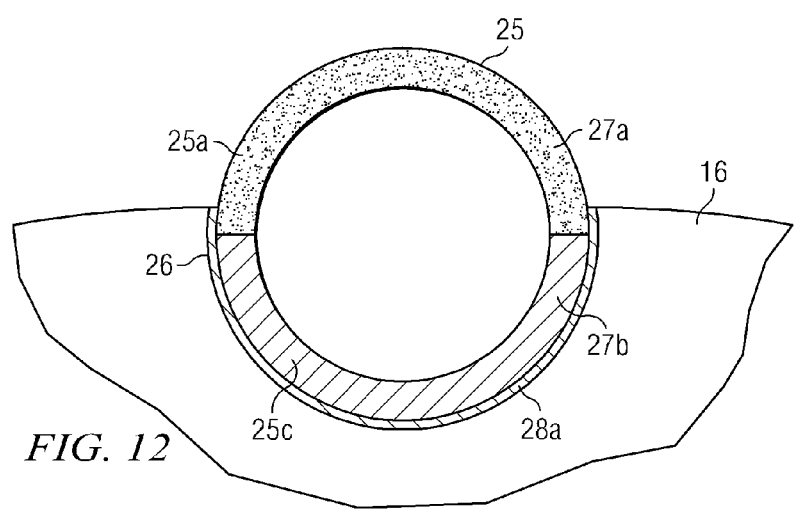
FIG. 12 shows a front view of an outer support element attached to a tool body according to one or more embodiments of the present disclosure.

In one or more embodiments, the outer support element may contain two or more regions formed from different materials. The regions may be formed by using different materials to form the different regions of the outer support element. The regions may also be formed by using two or more preformed segments, as discussed hereinafter. For example, as shown in FIG. 7, the outer support element may have an outer region 25a formed of a carbide composition (e.g., tungsten carbide and cobalt binder) and an inner region 25b formed of a metal alloy (e.g., a steel alloy), as discussed above. Additionally, as shown in FIG. 12, outer support element 25 has been brazed into cutter pocket 26 on blade 16 using a first braze material 28a. Outer support element 25 contains two different regions 25a and 25c resulting from the use of two different compositions 27a and 27b to form element 25. For example, composition 27a may have a greater erosion resistance than composition 27b which may have a greater braze strength than composition 27a. In particular, composition 27a may have a lower cobalt content and greater median particle size for the metal carbide as compared to composition 27b. Additionally, composition 27a may also comprise ultrahard material particles, such as diamond, which can improve also improve erosion and/or abrasion resistance. One skilled in the art, based on the teachings of the present disclosure, would appreciate that various different compositions may be used for different regions of the outer support element depending on the particular application and desired properties.

In one or more embodiments, the outer surface of the outer support element may be coated with a material capable of improving one or more of erosion, corrosion, and/or abrasion resistance. Such coating materials may include, but are not limited to, hardfacing materials, chemical vapor deposition (CVD) materials (including plasma enhanced chemical vapor deposition (PE-CVD)), physical vapor deposition (PVD) materials, and atomic layer deposition (ALD) materials. Such coating materials and application techniques are known in the art.

The cutting element of the cutter assembly may be only partially disposed in the outer support element and thus partially surrounded by the outer support element. Referring again to FIG. 9, at least a portion of the cutting element may be referred to as an "exposed portion" 35 of the cutting element 20. Depending on the thickness of the exposed portion 35, exposed portion 35 may include at least a portion of the ultrahard material layer 22, the entire ultrahard material layer 22 with no substrate (i.e., exposed portion falls along the interface between the ultrahard material layer and the substrate), or the ultrahard material layer 22 and a portion of the substrate 24. As shown in FIG. 9, exposed portion 35 includes ultrahard material layer 22 and a portion of substrate 24. However, one of ordinary skill in the art, based on the teachings of the present disclosure, would recognize that while in the embodiment shown in FIG. 9 the exposed portion 35 is shown as being constant across the entire diameter of the cutting element 20, depending on the geometry of the cutting element components, the exposed portion of the cutting element may vary.

Figure 17:
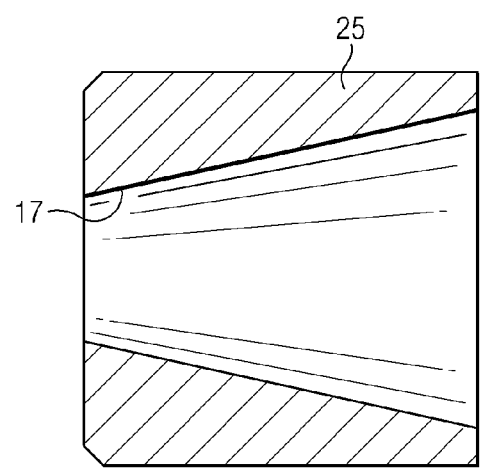
FIG. 17 shows a cross-sectional view of an outer support element according to one or more embodiments of the present disclosure.

The outer support element may be of any suitable thickness. In one or more embodiments, the outer support element may have a thickness of at least 0.025 inches (0.64 mm); suitably at least 0.05 inches (1.27 mm); more suitably at least 0.75 inches (1.91 mm). However, one of ordinary skill in the art, based on the teachings of the present disclosure, would recognize that depending on the geometry and size of the cutting element and outer support element, other thicknesses may be appropriate. One of ordinary skill in the art, based on the teachings of the present disclosure, would appreciate that the side portion of the outer support element may have a uniform thickness or may vary in thickness. The thickness may vary in the radial and/or axial direction, for example the thickness of the outer support side portion may increase in thickness in the axial direction between the end of the outer support element adjacent the exposed portion of the cutting element and the opposite end such that the inner surface (cavity) is tapered. The variation in thickness may be continuous (graded) or incremental (step-wise). As shown in FIG. 17, the outer support element 25 has a tapered inner surface 17. Such taper results in a conical shaped cavity in the outer support element 25 which can receive a complementary shaped base portion of a cutting element (not shown) to be positioned within outer support element 25.

The outer support element includes a side portion (33 as shown in FIGS. 3 and 10). The outer support element may also include a bottom portion (31 as shown in FIG. 10). In one or more embodiments, the end face (79 as shown in FIGS. 5, 6) of the outer support element proximate the end face of the cutting element may be perpendicular to the outer side surface and the inner cavity surface of the outer support element. In one or more embodiments, the end face (79 as shown in FIG. 23C) may be substantially perpendicular to the central longitudinal axis of the outer support element with peripheral edge 80 formed between the end face 79 and inner surface 17 of the outer support element 25 having a radiused surface. In one or more embodiments, the end face (79 as shown in FIG. 4) of the outer support element proximate the end face of the cutting element may have a beveled surface forming all or a portion of end face 79. The beveled surface may form a bevel angle in the range of from 10 to less than 90 degrees with respect to the central longitudinal axis, for example 15, 20, 25, 30, 35, 40, 45, 50, 55, 60, 65, 70, or 75 degrees. In one or more embodiments, the end face (79 as shown in FIG. 20) of the outer support element proximate the end face of the cutting element may be substantially convex. Alternatively, the end face of the outer support element proximate the end face of the cutting element may be substantially concave.

While the bottom portion 31 and side portion 33 of the outer support element 25 are shown in FIG. 10 as being integral, one or ordinary skill in the art, based on the teachings of the present disclosure, would appreciate that the side portion and the optional bottom portion may alternatively be formed from two or more separate segments attached together, for example attached together using a braze material and/or attached together using a mechanical locking mechanism as discussed above such as one or more mating protrusions and cavities press fit together. The braze material used to attach the segments together may suitably have a melting temperature that is higher than the melting temperature of the first braze material used to attach the outer support element to the cutter pocket. In some embodiments, the outer support element may be formed from two or more separate pieces attached together on a vertical or horizontal plane (with respect to the cutting element axis, for example). One of ordinary skill in the art, based on the teachings of the present disclosure, would also appreciate that the different segments may have different material compositions. The compositions of the different segments may be chosen based on the end use application.

Figure 13:
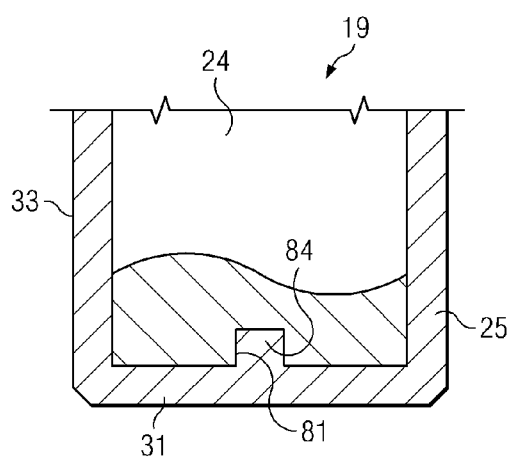
FIG. 13 shows a partial cross-sectional view of a cutter assembly according to one or more embodiments of the present disclosure.
Figure 14:
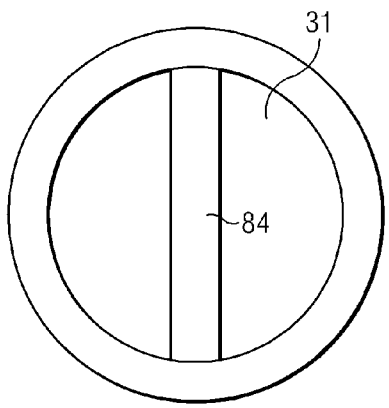
FIG. 14 shows a top view of the outer support element of FIG. 13.

In one or more embodiments, the bottom portion may have one or more protrusions (male surface features) or cavities (female surface features) along the inner surface adjacent the cutting element and the adjacent surface of the cutting element may have a mating protrusion or cavity. For example, FIG. 13 shows a partial cross sectional view of cutter assembly 19 comprising outer support element 25 and cutting element substrate 24. The outer support element 25 has a side portion 33 and a bottom portion 31. Bottom portion 31 has an elongate protrusion 84 which is mated within a corresponding cavity 81 in substrate 24. FIG. 14 is a partial top view of the bottom portion 31 containing protrusion 84. This arrangement helps to resist any rotational forces experienced by the cutting element when in operation. Alternatively, the bottom portion may form the cavity and the substrate may form the elongate protrusion. One skilled in the art, based on the teachings of the present disclosure, would appreciate that this is but one example and other sizes and shapes of the protrusions/cavities may be used.

In one or more embodiments, one or more shims may be utilized between the bottom portion of the outer support element and the tool body. The shim may comprise a metal or metal alloy, for example copper, nickel, lead, mixtures and alloys thereof. In one or more embodiments, the shim may comprise a two component system containing a metal or metal alloy layer interposed between two braze alloy layers. The metal or metal alloy layer has a greater melting temperature than the braze alloy used in the configuration, for example the metal or metal alloy may contain copper, nickel, iron, mixtures and alloys thereof. Additionally, or alternatively, an inner sleeve may be used between the outer support element and the tool body. The inner sleeve may comprise a metal or metal alloy, for example copper, nickel, lead, mixtures and alloys thereof. The inner sleeve may have the same composition or a different composition from the shim if both are used. The use of a sleeve and/or a shim can help to absorb impact forces as the tool is used in a drilling application and can help improve the braze strength.

Figure 15:
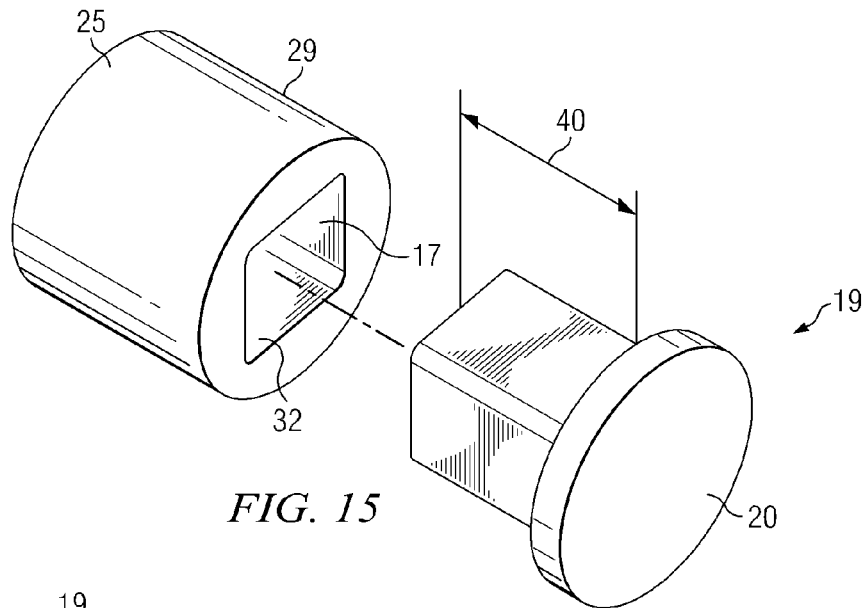
FIG. 15 shows a perspective view of a cutter assembly according to one or more embodiments of the present disclosure.

Although the outer support element and the cutting element are depicted in the figures as cylindrical, one of ordinary skill in the art would recognize that other geometries or shapes may be used and the geometry or shape of the outer surface of the outer support element may be different from the outer surface of the portion of the cutting element positioned within the outer support element. Cross-sectional geometries or shapes viewed in a plane perpendicular to the cutting element axis may include, but are not limited to, generally circular, elliptical, ovoid, and polygonal such as trapezoidal, triangular, rectangular, square, etc. Preferably, the cross-sectional geometry may be circular. FIG. 15 shows a cutter assembly 19 with an outer support element 25 having an outer side surface 29 which is generally circular in cross-section and having an inner surface 17 forming cavity 32 which is generally square in cross-section (corners being radiused/rounded). Cutting element 20 has a base portion 40 to be positioned within the outer support element cavity 32. Base portion 40 has a complementary generally square-shaped cross-section to cavity 32. Such an arrangement is advantageous as the generally square geometry helps to resist any rotational forces experienced by the cutting element when in operation.

Figure 16:
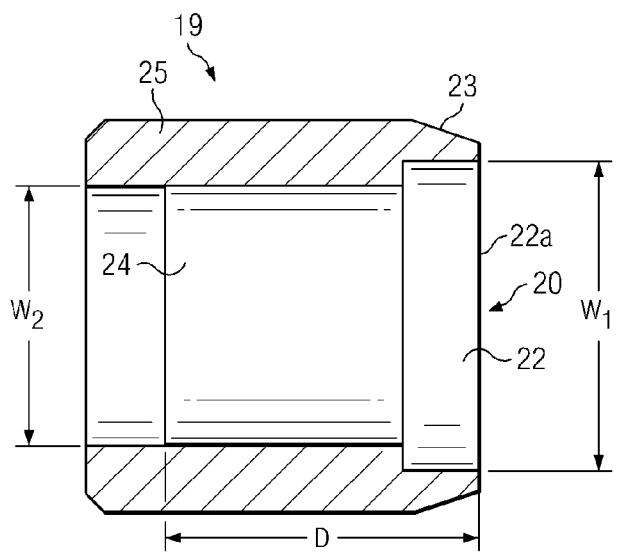
FIG. 16 shows a cross-sectional view of a cutter assembly according to one or more embodiments of the present disclosure.

The portion of the cutting element to be positioned within the outer support element may be of any suitable size or shape. The width (radial direction) of the portion positioned within the outer support element may vary in width along the axial length. As shown in FIG. 16, outer support element 25 spans the entire axial length of cutting element 20 and the width varies incrementally along the length of the cutting element such that the ultrahard material layer 22 has a width, $w_1$, which is greater than the width, $w_2$, of the substrate an axial distance, D, from cutting face 22a of cutting element 20. Although depicted as a step-wise change in width along the length of the cutting element, one skilled in the art would appreciate that two or more step-wise changes in width may be used or that the width may vary in a continuous manner. The outer surface of the outer support element 25 may also be beveled 23 adjacent the portion of cutting face 22a which will engage the earthen formation during drilling. The bevel may be such that the thickness of the outer support element proximate the cutting face is relatively thin but at least 0.025 inches (0.64 mm). Although shown in FIG. 16 as having the entire length (100%) of the cutting element positioned within the outer support element, it is also within the scope of the present disclosure that the length of the cutting element positioned within the outer support element may be of any suitable length, for example at least 75% of the length of the cutting element may be positioned within the outer support element, suitably at least 85%, more suitably at least 90%.

In one or more embodiments, the outer support element of the cutter assembly may be positioned a select distance behind the cutting face of the cutting element, suitably a select distance behind the interface of the ultrahard material layer and the substrate. The outer support element may extend to substantially the same radial distance from the central longitudinal axis 11 of the cutting element 20 as the side surface of the ultrahard material layer. The select distance behind the cutting face may be in the range of from 0.04 to 0.3 inches (1 mm to 7.5 mm), suitably the exposed portion of the cutting element may be a select distance behind the interface between the cutting element substrate and the ultrahard material layer, for example from 0 to 0.25 inches (0 mm to 6 mm). In this embodiment, any of the above mentioned attachment mechanisms may be used to attach the cutting element to the outer support element. The term "substantially the same radial distance" is meant to include differences in radial distance along the side surfaces of at most ±0.05 inches (1.3 mm), preferably at most ±0.025 inches (0.65 mm), more preferably at most ±0.01 inches (0.25 mm).

The ultrahard material layer of the cutting element may be of any suitable thickness. In one or more embodiments, the ultrahard material layer of the cutting element has a thickness of at least 0.050 inches (1.27 mm). However, one of ordinary skill in the art, based on the teachings of the present disclosure, would recognize that depending on the geometry and size of the cutting element, other thicknesses may be appropriate.

In one or more embodiments, instead of using a first braze material to attach the outer support element to the tool body, the outer support element may be cast into the tool body. For example, the outer support element may be placed within the mold cavity and subsequently infiltrated along with the matrix material (used to form the tool body) by an infiltrant alloy binder material when making the tool body. In one or more different embodiments, the outer support element may be provided by the tool body (e.g., bit blades).

One of ordinary skill in the art, based on the teachings of the present disclosure, would also appreciate that any design modifications regarding side rake, back rake, variations in geometry, variations in the configurations, material compositions, etc., may be included in various combinations not limited to those combinations described in the present disclosure. Bits having the cutter assemblies of the present disclosure may include a single cutter assembly with the remaining cutting elements being conventional cutting elements; or all cutting elements on the bit being included in a cutter assembly of the present disclosure; or any combination therebetween of cutter assemblies and conventional cutting elements. For example, cutter assemblies may be attached to a downhole tool using a high shear strength braze material in areas where erosion, abrasion and/or high impact loads can cause the loss of a conventional cutting element while the remainder of the tool uses conventional cutting elements.

In one or more embodiments, the placement of the cutter assemblies on the blade of a fixed cutter bit or on a roller cone bit may be selected such that the cutter assemblies are placed in areas experiencing the greatest wear (including erosion, corrosion, and/or abrasion forms of wear). For example, in one or more embodiments, the cutter assemblies may be placed on the shoulder or nose area of a fixed cutter drill bit. Additionally, one or ordinary skill in the art, based on the teachings of the present disclosure, would recognize that there exists no limitation on the sizes of the cutter assemblies of the present disclosure, in particular the cutting elements. For example, in various embodiments, the ultrahard material layer of cutting elements may be formed in sizes including, but not limited to, 9 mm, 13 mm, 16 mm, and 19 mm and the outer support elements may be formed to complement such cutting element sizes.

In one or more embodiments described herein, the cutter assemblies allow for the cutting elements to be easily replaced, and thus, the downhole tool to be rebuilt, at the drilling location without having to ship the used tool to a rebuild manufacturing facility resulting in greatly improved efficiencies. For example, a solvent may be used to remove the adhesive attaching the cutting element within the outer support element, or the low temperature braze material or solder material may be heated with a lightweight portable hand-held torch to loosen the cutting element from the outer support element, or the mechanical locking mechanism may be loosened and the cutting element removed. Once the cutting element is removed from the outer support element, it may be rotated (60, 90, 120, or 180 degrees) and re-attached within the outer support element (if the ultrahard material layer is in good condition) or a different cutting element may be attached.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A downhole cutting tool, comprising:
 a cutting element support structure having at least one cutter pocket formed therein;
 at least one outer support element immovably attached to the at least one cutter pocket; and
 at least one cutting element positioned within a cavity of the outer support element and immovably attached thereto utilizing a mechanical locking mechanism of a set pin arrangement or a spring-loaded retention arrangement arranged to immovably attach the at least one cutting element to the at least one outer support and positioned such that the mechanism is exposed in part to the outer surface of the tool, the cutting element comprising a substrate and an ultrahard material layer bonded to the substrate.

2. A downhole tool for drilling an earthen formation, comprising
 a tool body; and
 an indexable cutter assembly mounted thereon, the indexable cutter assembly comprising
  an outer support element and a cutting element comprising a substrate and an ultrahard material layer;
  wherein:

the ultrahard material layer has a cutting face, cutting edge, and a side surface;

the outer support element comprises an outer surface and an inner surface defining a cavity;

at least a portion of the cutting element is positioned within the cavity of the outer support element;

the outer support element extends at least a majority of an axial length of the cutting element;

the outer support element and the cutting element comprise an indexable arrangement providing at least two selected positions of the cutting element within the outer support element such that one of the at least two selected positions provides a first portion of the ultrahard material layer for contacting the earthen formation during drilling; and the cutting element is immovably attached to the outer support element.

3. The downhole tool of claim 2, wherein the indexable arrangement has at least 4 positions.

4. The downhole tool of claim 2, wherein the indexable arrangement comprises an opening in a side portion of the outer support element; two or more openings in the outer surface of the portion of the cutting element to be positioned within the cavity of the outer support element; and a mechanism to engage the opening in the outer support element and an opening in the cutting element such that the cutting element is immovable during use.

5. The downhole tool of claim 4, wherein the mechanism is selected from the group consisting of a set pin arrangement and a spring-loaded retention arrangement.

6. The downhole tool of claim 2, wherein the indexable arrangement comprises one or more projections and mating cavities.

7. The downhole tool of claim 2, wherein the indexable arrangement comprises an inner surface of the outer support element having three or more sides to form a generally polygonal cavity and the portion of the cutting element to be positioned within the outer support element having a complementary generally polygonal outer surface.

8. The downhole tool of claim 7, wherein the cutting element is immovably attached to the outer support element using an adhesive.

9. The downhole tool of claim 7, wherein the cutting element is immovably attached to the outer support element using a solder material.

10. The downhole tool of claim 7, wherein the cutting element is immovably attached to the outer support element using a braze material which has a braze temperature of less than 700° C.

11. The downhole tool of claim 2, wherein the ultrahard material layer has a canted cutting face.

12. The downhole tool of claim 11, wherein the cutting face is canted at an angle with respect to a longitudinal axis of the cutting element in the range of from 45 to 135 degrees.

13. The downhole tool of claim 2, wherein the at least two selected positions provide for a peripheral edge having different bevel sizes or bevel angles.

14. The downhole tool of claim 2, wherein the at least two selected positions provide for a cutting face having different back rake or side rake angles.

15. The downhole tool of claim 2, wherein the outer surface of the outer support element extends substantially the same radial distance from a central longitudinal axis of the cutting element as the side surface of the ultrahard material layer.

16. The downhole tool of claim 2, wherein the outer support element is formed using a different material than the material used to form the substrate of the cutting element.

17. The downhole tool of claim 16, wherein the material used to form the outer support element has a greater erosion resistance than the material used to form the substrate of the cutting element.

18. The downhole tool of claim 2, wherein the inner surface of the outer support element and the surface of the portion of the cutting element positioned within the outer support element are formed such that there is a substantially uniform distance between the surfaces of the outer support element and the cutting element.

19. The downhole tool of claim 2, wherein the ultrahard material layer comprises polycrystalline diamond.

20. The of claim 2, wherein the indexable arrangement is formed by mating, non-cylindrical surfaces between the outer support element and the cutting element.

21. A downhole tool for drilling an earthen formation comprising, a tool body; and an indexable cutter assembly mounted thereon, the indexable cutter assembly comprising an outer support element and a cutting element comprising a substrate and an ultrahard material layer; wherein:

the ultrahard material layer has a cutting face, cutting edge, and a side surface;

the outer support element comprises an outer surface and an inner surface defining a cavity;

at least a portion of the cutting element is positioned within the cavity of the outer support element;

the outer support element and the cutting element comprise an indexable arrangement of the cutting element repositionable relative to the outer support element, providing at least two selected positions of the cutting element within the outer support element such that one of the at least two selected positions provides the cutting edge of the ultrahard material layer for contacting the earthen formation during drilling; and the cutting element is immovably attached to the outer support element.

22. The downhole tool of claim 21, wherein the outer support element is provided by the tool body.

23. The downhole tool of claim 21, wherein the outer support element is mounted on the tool body using a first braze material.

24. The downhole tool of claim 21, wherein the outer support element is infiltrated into the tool body.

25. The downhole tool of claim 21, wherein the outer support element extends at least a majority of an axial length of the cutting element.

26. The downhole tool of claim 21, wherein the indexable arrangement is formed by mating, non-cylindrical surfaces between the outer support element and the cutting element.

27. The downhole tool of claim 21, wherein the cutting element is repositionable relative to the outer support element at incremental degrees of rotation.

* * * * *